US012600213B2

(12) United States Patent (10) Patent No.: US 12,600,213 B2
Lin et al. (45) Date of Patent: Apr. 14, 2026

(54) QUICKLY ASSEMBLED AND DISASSEMBLED WINDOW FRAME STRUCTURE

(71) Applicant: Fujian Fuyao Automotive Trim System Co., Ltd., Fuqing (CN)

(72) Inventors: Yan Lin, Fuqing (CN); Shaoyi Qiu, Fuqing (CN); Fangmin Yu, Fuqing (CN); Deen Lian, Fuqing (CN)

(73) Assignee: FUJIAN FUYAO AUTOMOTIVE TRIM SYSTEM CO., LTD., Fujian (CN)

( * ) Notice: Subject to any disclaimer, the term of this patent is extended or adjusted under 35 U.S.C. 154(b) by 231 days.

(21) Appl. No.: 18/132,639

(22) Filed: Apr. 10, 2023

(65) Prior Publication Data

US 2023/0241953 A1 Aug. 3, 2023

Related U.S. Application Data

(63) Continuation of application No. PCT/CN2021/102573, filed on Jun. 26, 2021.

(30) Foreign Application Priority Data

Oct. 27, 2020 (CN) .......................... 202011160915.0

(51) Int. Cl.
B60J 11/08 (2006.01)
B60J 1/00 (2006.01)
B60S 1/56 (2006.01)

(52) U.S. Cl.
CPC ............... B60J 11/08 (2013.01); B60J 1/007 (2013.01); B60S 1/56 (2013.01)

(58) Field of Classification Search
CPC ..... B60J 1/007; B60J 1/16; B60J 11/08; B60J 1/085; B60S 1/56; E05C 3/004; E05C 3/145; E06B 1/40; E06B 1/342
See application file for complete search history.

(56) References Cited

U.S. PATENT DOCUMENTS 4,042,004 A * 8/1977 Kwan ..................... E05D 5/023
49/501
4,262,450 A * 4/1981 Anderson ................. E06B 3/62
49/425

(Continued)

FOREIGN PATENT DOCUMENTS

CN 105539087 A 5/2016
CN 208948702 U 6/2019

(Continued)

OTHER PUBLICATIONS

International Search Report dated Sep. 30, 2021 issued in PCT/CN2021/102573.

*Primary Examiner* — Daniel P Cahn

*Assistant Examiner* — Patrick B. Ponciano

(74) *Attorney, Agent, or Firm* — Scully, Scott, Murphy & Presser, P.C.

(57) ABSTRACT

An assembled and disassembled window frame structure includes a sliding window frame, within which two pieces of movable glass are mounted. The sliding window frame is provided with a rail. The rail at an upper side of a movable glass defines a section of notch, through which the moveable glasses can be removed upwards. A trim strip for sealing the notch is detachably mounted in the notch. A cover plate is detachably mounted at an upper side of the trim strip. A latch is fixedly mounted on the sliding window frame. The latch is located at an upper side of the cover plate and is configured to fix the cover plate and the trim strip.

16 Claims, 13 Drawing Sheets

(56) References Cited

U.S. PATENT DOCUMENTS

| | | | | | |
|---|---|---|---|---|---|
| 4,991,349 | A * | 2/1991 | Barthelemy | ............... | B60J 1/10 |
| | | | | | 49/504 |
| 5,829,195 | A * | 11/1998 | Ojanen | .................... | B60J 1/085 |
| | | | | | 160/180 |
| 6,330,765 | B1 * | 12/2001 | Dahl | .................. | B62D 33/0621 |
| | | | | | 49/463 |
| 8,322,091 | B2 * | 12/2012 | Smith | ..................... | B60J 1/007 |
| | | | | | 49/501 |
| 8,429,865 | B2 * | 4/2013 | Nania | ..................... | B60J 1/004 |
| | | | | | 296/201 |
| 8,595,981 | B2 * | 12/2013 | Lahnala | ................ | B60J 1/1853 |
| | | | | | 49/413 |
| 8,782,956 | B2 * | 7/2014 | Giroux | .................... | B60J 1/007 |
| | | | | | 49/504 |
| 8,783,497 | B2 * | 7/2014 | Sakai | ..................... | F16J 15/04 |
| | | | | | 411/378 |
| 10,654,342 | B2 * | 5/2020 | Andersson | ............... | B60J 1/007 |
| 10,668,788 | B2 * | 6/2020 | Vollmar | ................ | B61D 25/00 |
| 10,974,574 | B2 * | 4/2021 | Seacat | .................... | B60J 1/2094 |
| 11,053,715 | B2 * | 7/2021 | Damboiu | .............. | E05B 39/007 |
| 11,466,507 | B2 * | 10/2022 | Eck | ........................... | B60J 1/007 |
| 12,269,321 | B2 * | 4/2025 | Meda | ........................ | B60J 1/007 |
| 2005/0160677 | A1 * | 7/2005 | Gepfrey | ............... | E06B 3/9641 |
| | | | | | 49/504 |
| 2009/0267382 | A1 * | 10/2009 | Smith | ........................ | B60J 1/16 |
| | | | | | 296/146.15 |
| 2012/0227325 | A1 * | 9/2012 | Diamant | .................... | B60J 1/16 |
| | | | | | 49/149 |
| 2019/0211612 | A1 * | 7/2019 | Vander Bent, Jr. | ... | E06B 3/5835 |
| 2025/0214398 | A1 * | 7/2025 | Giret | ....................... | B60J 1/085 |

FOREIGN PATENT DOCUMENTS

| | | | | | | |
|---|---|---|---|---|---|---|
| CN | 110774874 | A | * | 2/2020 | ............. | B60J 1/085 |
| CN | 211280583 | U | * | 8/2020 | | |
| DE | 2418259 | A1 | * | 4/1974 | | |
| FR | 2837427 | A1 | * | 9/2003 | ............. | B60J 1/085 |
| KR | 900010879 | Y1 | * | 12/1990 | ............. | B60J 1/085 |
| WO | 2018102359 | A1 | | 6/2018 | | |

* cited by examiner

A-A

402

410

400

511

512

510

420

QUICKLY ASSEMBLED AND DISASSEMBLED WINDOW FRAME STRUCTURE

CROSS-REFERENCE TO RELATED APPLICATION(S)

This application is a continuation of International Application No. PCT/CN2021/102573, filed Jun. 26, 2021, which claims priority to and the benefit of Chinese Patent Application No. 202011160915.0, filed Oct. 27, 2020, the entire disclosures of which are hereby incorporated by reference.

TECHNICAL FIELD

This disclosure relates to the field of manufacturing technology, and in particular to a quickly assembled and disassembled window frame structure.

BACKGROUND

With rapid development of manufacturing industry, requirements of people for sliding window structures are constantly improved, and in particular, various sliding window structures have been developed in the field of vehicle windows. However, in an existing sliding window structure, a sliding window structure of a lower-end separated type is unable to be quickly assembled and disassembled, and during assembling and disassembling of a sliding window structure of an upper-end separated type, a weather strip needs to be flipped, such that sliding stagnation, water leakage, and the like, are easy to occur. Regarding a sliding window structure of an accessory-auxiliary-assembly type, a high machining accuracy is needed, and an abut joint needs to be sealed with adhesive. Regarding a sliding window structure of a connecting-plate type, an assembly and disassembly operator is required to have assembly and disassembly skills of relevant tools. Therefore, for a customer who needs to assemble, disassemble, clean, and maintain a glass sheet with high frequency, the existing sliding window structure is unable to meet requirements of the customer for quick assembly and disassembly of the sliding window and a sealing performance of a sliding window assembled.

SUMMARY

In view of this, a quickly assembled and disassembled window frame structure is provided in the present disclosure and is for assembling and disassembling a glass sheet. The quickly assembled and disassembled window frame structure includes an upper frame, a rail, and a cover plate. The rail is disposed at one side of the upper frame. The rail defines a sliding space. The glass sheet has one end disposed in the sliding space. The glass sheet is configured to slide in the rail. The rail defines a notch penetrating through two opposite surfaces of the rail, and the notch is away from a surface of the rail where the upper frame is disposed. The glass sheet is assembled and disassembled through the notch. The cover plate covers one side of the rail away from the glass sheet. The cover plate is configured to seal the notch, and the glass sheet is slidable on the cover plate.

BRIEF DESCRIPTION OF THE DRAWINGS

In order to describe technical solutions in implementations of the present disclosure more clearly, accompanying drawings required to be used in implementations of the present disclosure will be described below.

REFERENCE SIGNS

Figure 1:
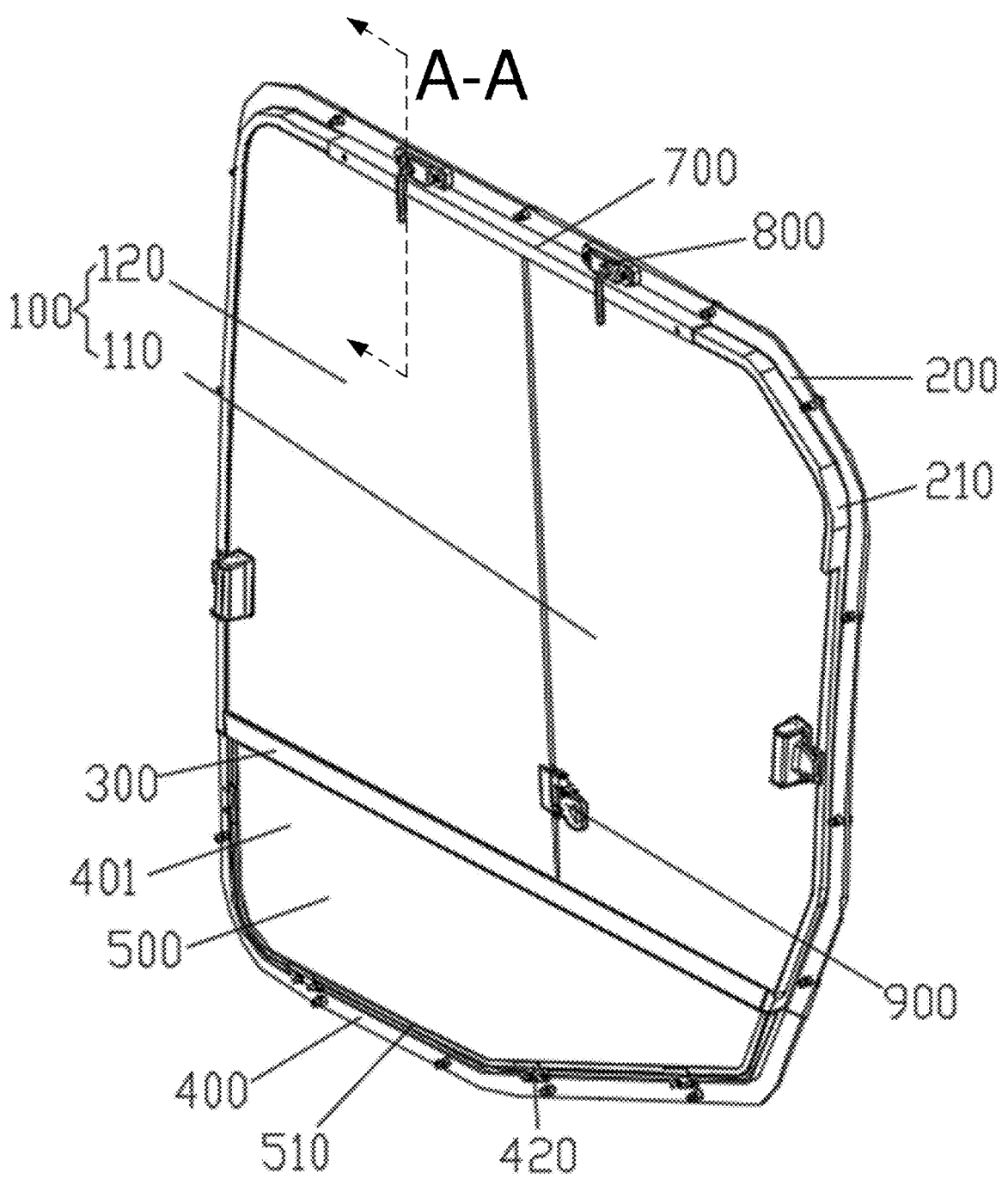
FIG. 1 is an inside perspective view of a quickly assembled and disassembled window frame structure in implementations of the present disclosure.
Figure 2:
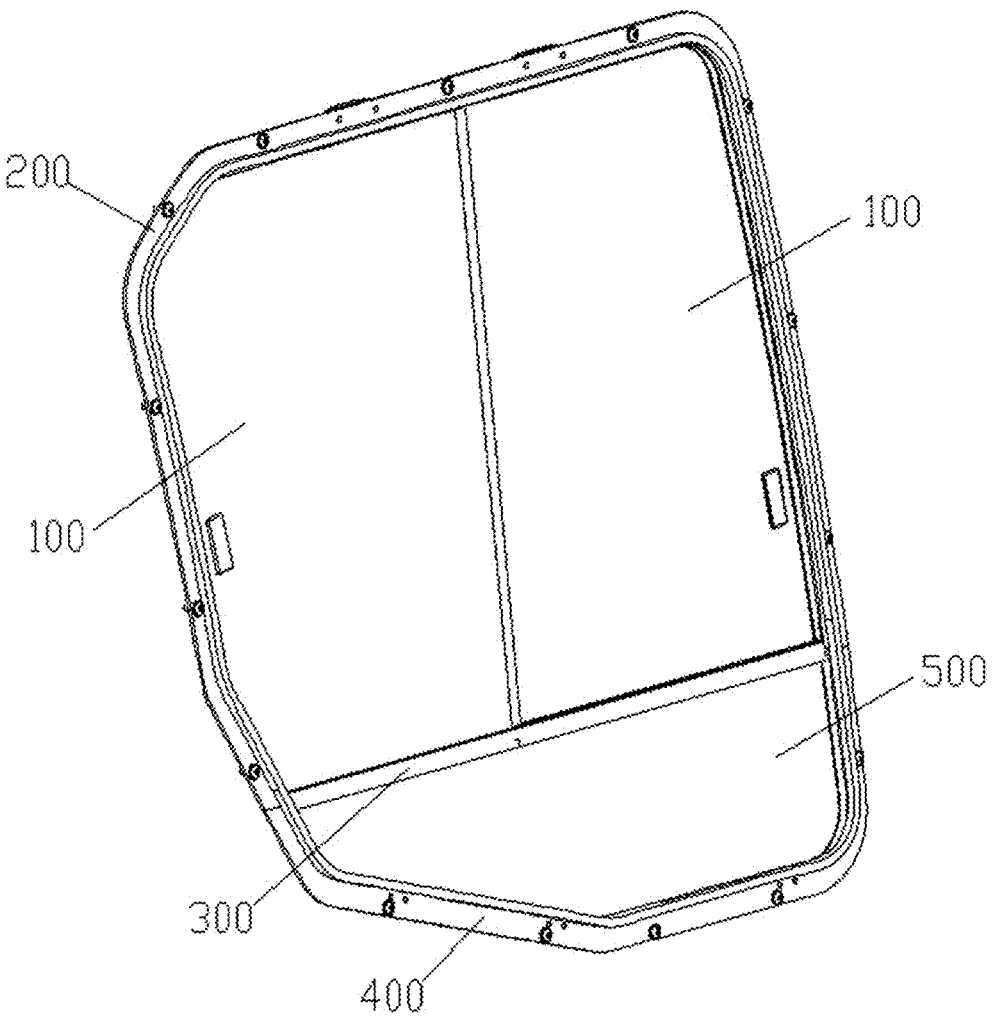
FIG. 2 is an outside perspective view of a quickly assembled and disassembled window frame structure in implementations of the present disclosure.

100—glass sheet, 110—first sub-glass sheet, 120—second sub-glass sheet, 200—upper frame, 210—rail, 211—notch, 212—reverse oblique angle, 213—sliding space, 2131—first sliding sub-space, 2132—second sliding sub-space, 220—main gasket, 2201—first main sub-gasket, 2202—second main sub-gasket, 221—absent section, 222—notch section, sealing section—223, sliding section—224, 300—cross member, 310—U-shaped groove, 400—lower frame, 401—accommodation space, 401—notch slot, 410—limiting frame strip, 420—fastener, 500—fixed glass sheet, 510—weather strip, carrier portion—511, sealing portion—512, 600—trim strip, 610—sliding groove, 611—first sliding sub-groove, 612—second sliding sub-groove, 620—secondary gasket, 6201—first secondary sub-gasket, 6202—second secondary sub-gasket, 621—absent portion, 630—oblique angle, 640—rib, 700—cover plate, 701—first sub-cover plate, 702—second sub-cover plate, 710—locking hole, 711—first locking sub-hole, 712—second locking sub-hole, 720—snap-fit portion, 730—rivet hole, 740—limiting groove, 750—rivet, 800—latch, 801—connecting portion, 810—base plate, 820—face plate, 830—locking portion, 831—limiting recess, 840—handle, 850—spring lamina-tion, 851—raised portion, 900—friction lock, 910—support tray, 911—slot, 920—grip, 921—pressing portion, 930—friction strip.

DETAILED DESCRIPTION

The following are preferred implementations of the pres-ent disclosure. It should be noted that for those of ordinary skill in the art, without departing from a concept of the present disclosure, several modifications and improvements can be made, and these modifications and improvements are also regarded to fall in the protection scope of the present disclosure.

Before introducing technical solutions of the present disclosure, background problems in the related art will be introduced in detail.

A glass window of a vehicle includes an upper sliding window and a lower fixed window. A sliding window part generally includes following four types. ① a lower-end separated type (lower aluminum includes aluminum A and aluminum B); ② an upper-end separated type (upper alu-minium includes aluminum A and aluminum B); ③ an accessory-auxiliary-assembly type (e.g., an auxiliary rubber strip, a sliding block, and other easily disassembled acces-sories, which results in a segment difference before and after assembly); and ④ a connecting-plate type (one edge or part of a window frame is not welded, and a connecting plate is used for connection and fixation during assembly). Regard-ing type ①, quick assembly and disassembly is unable to be realized. Regarding type ②, during assembly and disas-sembly, a weather strip needs to be flipped, and if an assembly operation is not in place, functional defects may be caused after reassembling, for example, problems such as sliding stagnation, water leakage, and the like. Regarding type ③, a drilling-positioning problem exists, a high machining accuracy is needed, and an abut joint needs to be sealed with adhesive. Regarding type ④, a relevant tool/equipment/frock needs to be used for disassembly, and an assembly and disassembly operator needs to have relevant post skills.

The fixed window generally includes following three types. ① locking of a fixed glass sheet+a rubber strip+a center pillar/cross member; ② adhesive is filled around the fixed glass sheet; ③ interference fit of an adhesive strip and the glass sheet. Regarding type ①, a locking position is prone to abutting joint water leakage. Regarding type ②, the adhesive needs to be cleaned when disassembling, and the adhesive needs to be refilled when assembling, such that the quick assembly and disassembly is unable to be realized, and requirements for the operator are high. Regarding type ③, sealing in form of adhesive strip is mostly the interfer-ence fit, which needs to be completed by knocking, and glass sheet is prone to scratch during assembly.

In summary, assembly and disassembly technologies for an existing window frame are unable to meet requirements of a customer who needs to assemble, disassemble, clean, and maintain the glass sheet with high frequency.

In the related art, with rapid development of manufactur-ing industry, requirements of people for sliding window structure are constantly improved, and in particular, various sliding window structures have been developed in the field of vehicle windows. However, in an existing sliding window structure, a sliding window structure of a lower-end sepa-rated type is unable to be quickly assembled and disas-sembled, and during assembling and disassembling of a sliding window structure of an upper-end separated type, a weather strip needs to be flipped, such that sliding stagna-tion, water leakage, and the like, are easy to occur. Regard-ing a sliding window structure of an accessory-auxiliary-assembly type, a high machining accuracy is needed, and an abut joint needs to be sealed with adhesive. Regarding a sliding window structure of a connecting-plate type, an assembly and disassembly operator is required to have assembly and disassembly skills of relevant tools. Therefore, for a customer who needs to assemble, disassemble, clean, and maintain glass sheet with high frequency, the existing sliding window structure is unable to meet requirements of the customer for quick assembly and disassembly of the sliding window and a sealing performance of a sliding window assembled.

In view of this, a quickly assembled and disassembled window frame structure is provided in the present disclosure and is for assembling and disassembling a glass sheet. The quickly assembled and disassembled window frame struc-ture includes an upper frame, a rail, and a cover plate. The rail is disposed at one side of the upper frame. The rail defines a sliding space. The glass sheet has one end disposed in the sliding space. The glass sheet is configured to slide in the rail. The rail defines a notch penetrating through two opposite surfaces of the rail, and the notch is away from a surface of the rail where the upper frame is disposed. The glass sheet is assembled and disassembled through the notch. The cover plate covers one side of the rail away from the glass sheet. The cover plate is configured to seal the notch, and the glass sheet is slidable on the cover plate.

Regarding the quickly assembled and disassembled win-dow frame structure provided in the present disclosure, the rail is disposed at one side of the upper frame, the end of the glass sheet is disposed in the sliding space of the rail, the rail defines the notch penetrating through two opposite surfaces of the rail, the notch is away from the surface of the rail where the upper frame is disposed, the glass sheet is assembled and disassembled through the notch, the cover plate covers one side of the rail away from the glass sheet and is configured to seal the notch, and the glass sheet can slide onto the cover plate from the sliding space. When the cover plate is disassembled, the glass sheet can be disas-sembled from the notch. Before the cover plate is assembled, the glass sheet can be assembled from the notch, and the notch can be sealed by the cover plate. Therefore, conve-nience and quickness are realized, an operation difficulty is low, an assembly-and-disassembly efficiency is high, the glass sheet can be conveniently replaced and cleaned by a customer regularly, and requirements of assembly, disassem-bly, cleaning, and maintenance with high frequency are met. In addition, reliability is high, and no functional problems such as sliding stagnation, water leakage and the like occur after an assembly and disassembly operation is carried out by the customer.

In implementations, the quickly assembled and disas-sembled window frame structure further includes a trim strip. The trim strip is connected with the cover plate. The trim strip is disposed at one side of the cover plate close to the glass sheet, and the trim strip defines a sliding groove. The cover plate is configured to seal the notch. The sliding groove communicates with the sliding space at two ends of the sliding groove to make the glass sheet slide from the rail to the sliding groove.

In implementations, the cover plate includes a first sub-cover plate and a second sub-cover plate that are connected in a bent manner. The first sub-cover plate is configured to cover one side of the notch away from the glass sheet. The first sub-cover plate defines a limiting groove at one side of the first sub-cover plate close to the trim strip. The trim strip is provided with a rib at one side of the trim strip close to the first sub-cover plate. The rib is disposed in the limiting groove. The second sub-cover plate is configured to cover one side of the notch away from the upper frame. The second sub-cover plate is provided with a snap-fit portion at one end of the second sub-cover plate away from the first sub-cover plate. The snap-fit portion extends towards the upper frame. The snap-fit portion is configured to abut against one side of the trim strip away from the first sub-cover plate.

In implementations, the quickly assembled and disassembled window frame structure further includes a main gasket and a secondary gasket. Part of the main gasket is disposed in the sliding space. The secondary gasket is disposed in the sliding groove. The cover plate is configured to seal the notch, and the secondary gasket is configured to abut against the main gasket at two ends of the secondary gasket.

In implementations, the rail defines a first sliding sub-space and a second sliding sub-space arranged side by side in a direction away from the upper frame. The main gasket includes a first main sub-gasket and a second main sub-gasket. Part of the first main sub-gasket is disposed in the first sliding sub-space. The second main sub-gasket is disposed in the second sliding sub-space. The sliding groove has a first sliding sub-groove and a second sliding sub-groove arranged side by side in the direction away from the upper frame. The secondary gasket includes a first secondary sub-gasket and a second secondary sub-gasket. The first secondary sub-gasket is disposed in the first sliding sub-groove. The second secondary sub-gasket is disposed in the second sliding sub-groove. The cover plate is configured to seal the notch. The first secondary sub-gasket is configured to abut against the first main sub-gasket at two ends of the first secondary sub-gasket. The second secondary sub-gasket is configured to abut against the second main sub-gasket at two ends of the second secondary sub-gasket.

In implementations, the main gasket includes a sliding section and a sealing section. The sliding section is disposed in the sliding space. The sealing section has two ends connected with the sliding section. The sealing section is attached to the upper frame and exposed beyond the notch. A vertical distance between a surface of the sealing section away from the upper frame and the upper frame is less than a vertical distance between a surface of the sliding section away from the upper frame and the upper frame. The cover plate is configured to seal the notch, and the secondary gasket is configured to abut against the main gasket at the two ends of the secondary gasket.

In implementations, the second main sub gasket defines an absent section that is matched with the second secondary sub-gasket. The first secondary sub-gasket has a width that is cut by ¼ from an outside to define an absent portion. The first main sub-gasket has a width that is cut by ¾ from an inside to define a notch section. The notch section is matched with the first secondary sub-gasket.

In implementations, the quickly assembled and disassembled window frame structure further includes a friction lock. The friction lock includes a support tray, a grip, and a pressing portion. The glass sheet includes a first sub-glass sheet and a second sub-glass sheet. The first sub-glass sheet has one end disposed in the first sliding sub-space. The second sub-glass sheet has one end disposed in the second sliding sub-space. The support tray is disposed at one end of the second sub-glass sheet close to the first sub-glass sheet. The pressing portion is connected with the grip and faces the first sub-glass sheet. The grip is configured to control the pressing portion to move towards the first sub-glass sheet to make the pressing portion press the first sub-glass sheet.

The support tray defines a slot. The second sub-glass sheet is snapped into the slot. The slot and the second sub-glass sheet are fixed by adhesive. The pressing portion is provided with a friction strip at an end of the pressing portion facing the first sub-glass sheet to abut against the first sub-glass sheet.

In implementations, the notch away from the upper frame has an opening size larger than the notch close to the upper frame.

In implementations, the quickly assembled and disassembled window frame structure further includes a latch. The latch is operable in a locking state and an open state. The latch includes a connecting portion, a locking portion, and a handle. The connecting portion is connected with the upper frame. The locking portion and the handle are connected with the connecting portion. The cover plate defines a locking hole at one side of the cover plate away from the glass sheet. The handle is configured to switch the locking portion between the locking state in which the locking portion is disposed in the locking hole and the open state in which the locking portion is disposed outside the locking hole.

The latch further includes a base plate, a face plate, and a spring lamination. The locking portion and the spring lamination each are disposed between the base plate and the face plate. The spring lamination is disposed beside the locking portion. The spring lamination is provided with a raised portion at a side of the spring lamination facing the locking portion. The locking portion defines two limiting recesses. One of the two limiting recesses is in fit with the raised portion of the spring lamination when the latch in the locking state, and another of the two limiting recesses is in fit with the raised portion of the spring lamination when the latch in the open state.

In implementations, the locking portion and the handle each are rotatably connected with the connecting portion. The locking portion and the handle extend in a same direction. When the handle rotates in a direction close to the cover plate, the locking portion is configured to rotate towards the cover plate to enter the locking hole. When the handle rotates in a direction away from the cover plate, the locking portion is configured to rotate away from the cover plate to disengage from the locking hole.

In implementations, the locking hole includes a first locking sub-hole and a second locking sub-hole communicating with the first locking sub-hole. The first locking sub-hole has a hole size larger than the second locking sub-hole. When the locking portion rotates towards the cover plate to enter the locking hole, the locking portion is configured to rotate to the second locking sub-hole through the first locking sub-hole.

In implementations, the quickly assembled and disassembled window frame structure further includes a lower frame, a cross member, a fixed glass sheet, and a weather strip. The cross member is connected with the upper frame and the lower frame and is configured to separate the upper frame from the lower frame. The lower frame and the cross member cooperatively define an accommodation space. The weather strip includes a carrier portion and a sealing portion. The carrier portion surrounds the accommodation space.

The fixed glass sheet has one end disposed in the carrier portion. The sealing portion is disposed at one side of the carrier portion. The sealing portion is configured to seal a peripheral surface of the fixed glass sheet.

In implementations, the quickly assembled and disassembled window frame structure further includes at least one fastener. The lower frame defines at least one notch slot penetrating through a surface of the lower frame close to the fixed glass sheet. Each of the at least one fastener has one end disposed in each of the at least one notch slot, and another end connected with the carrier portion to press the fixed glass sheet.

Reference can be made to FIG. 1-FIG. 20. In view of this, a quickly assembled and disassembled window frame structure is provided in the present disclosure. The quickly assembled and disassembled window frame structure includes a sliding-window upper frame 200, within which two pieces of movable glass sheet 100 are mounted, that is, the glass sheet 100 includes a first sub-glass sheet 110 and a second sub-glass sheet 120. As illustrated in FIG. 1 and FIG. 5, a cover plate 700 covers one side of a rail 210 away from the glass sheet 100. The rail 210 defines a sliding space 213. An end of the glass sheet 100 is disposed in the sliding space 213 to make the glass sheet 100 slide in the rail 210. The two pieces of movable glass sheet are disposed inside and outside in a staggered manner. A sliding direction of a movable glass sheet is a front-back direction. The rail 210 is disposed on the sliding-window upper frame. The rail at an upper side of the movable glass sheet defines a notch 211, through which the movable glass sheet can be removed upwards. A length of the notch 211 is larger than a width of the movable glass sheet. The rail 210 defines the notch 211 penetrating two opposite surfaces of the rail 210, and the notch 211 is away from a surface of the rail 210 where the upper frame 200 is disposed. A trim strip 600 is detachably mounted in the notch 211 to seal the notch 211. The cover plate 700 is detachably mounted at an upper side of the trim strip 600. In other words, the trim strip 600 is disposed at one side of the cover plate 700 close to the glass sheet 100, so the cover plate 700 is configured to seal the notch 211. A latch 800 is fixedly mounted on the sliding-window upper frame, and the latch 800 is located at an upper side of the cover plate 700 to fix the cover plate 700 and the trim strip 600. In the window frame structure, the trim strip 600 corresponding to the notch 211 and the cover plate 700 corresponding to the notch 211 are fixed through the latch. When the latch is opened, the cover plate 700 and the trim strip 600 can be removed, and then the movable glass sheet can be removed from the notch 211 by sliding the movable glass sheet to the notch 211. In this way, the movable glass sheet can be conveniently replaced and cleaned by a customer regularly, assembly and disassembly can be completed manually, and a sealing member on the rail does not need to be flipped, such that functional defects (such as sliding stagnation, water leakage, and the like) possibly caused by improper remounting are avoided, thereby ensuring no functional problems occur after an assembly and disassembly operation is carried out by the customer. The trim strip 600 and the cover plate 700 are combined to form a main component for disassembly, such that a disassembly function and an assembly function of the movable glass sheet are realized. Therefore, quick assembly and disassembly can be realized, an operation difficulty is low, an assembly-and-disassembly efficiency is high, the movable glass sheet can be conveniently replaced and cleaned by the customer regularly, and the requirements of assembly, disassembly, cleaning, and maintenance with high frequency are met.

Reference can be made to FIG. 1 and FIG. 5 together. In view of this, a quickly assembled and disassembled window frame structure is provided in the present disclosure and is for assembling and disassembling a glass sheet 100. The quickly assembled and disassembled window frame structure includes an upper frame 200, a rail 210 disposed at one side of the upper frame 200, and a cover plate 700 covering one side of the rail 210 away from the glass sheet 100. The rail 210 defines a sliding space 213. The glass sheet 100 has one end disposed in the sliding space 213. The glass sheet 100 is configured to slide in the rail 210. The rail 210 defines a notch 211 penetrating through two opposite surfaces of the rail 210, and the notch 211 is away from a surface of the rail 210 where the upper frame 200 is disposed. The glass sheet 100 is assembled and disassembled through the notch 211. The cover plate 700 is configured to seal the notch 211, and the glass sheet 100 is slidable on the cover plate 700.

In view of the above, regarding the quickly assembled and disassembled window frame structure provided in the present disclosure, the rail 210 is disposed at one side of the upper frame 200, the end of the glass sheet 100 is disposed in the sliding space 213 of the rail 210, the rail 210 defines the notch 211 penetrating through two opposite surfaces of the rail 210, the notch 211 is away from the surface of the rail 210 where the upper frame 200 is disposed, the glass sheet 100 is assembled and disassembled through the notch 211, the cover plate 700 covers one side of the rail 210 away from the glass sheet 100 and is configured to seal the notch 211, and the glass sheet 100 can slide onto the cover plate 700 from the sliding space 213. When the cover plate 700 is disassembled, the glass sheet 100 can be disassembled from the notch 211. Before the cover plate 700 is assembled, the glass sheet 100 can be assembled from the notch 211, and the notch 211 can be sealed by the cover plate 700. Therefore, convenience and quickness are realized, the operation difficulty is low, the assembly-and-disassembly efficiency is high, the movable glass sheet 100 can be conveniently replaced and cleaned by the customer regularly, and requirements of assembly, disassembly, cleaning, and maintenance with high frequency are met. In addition, reliability is high, and no functional problems such as sliding stagnation, water leakage and the like occur after the assembly and disassembly operation is carried out by the customer.

Figure 3:
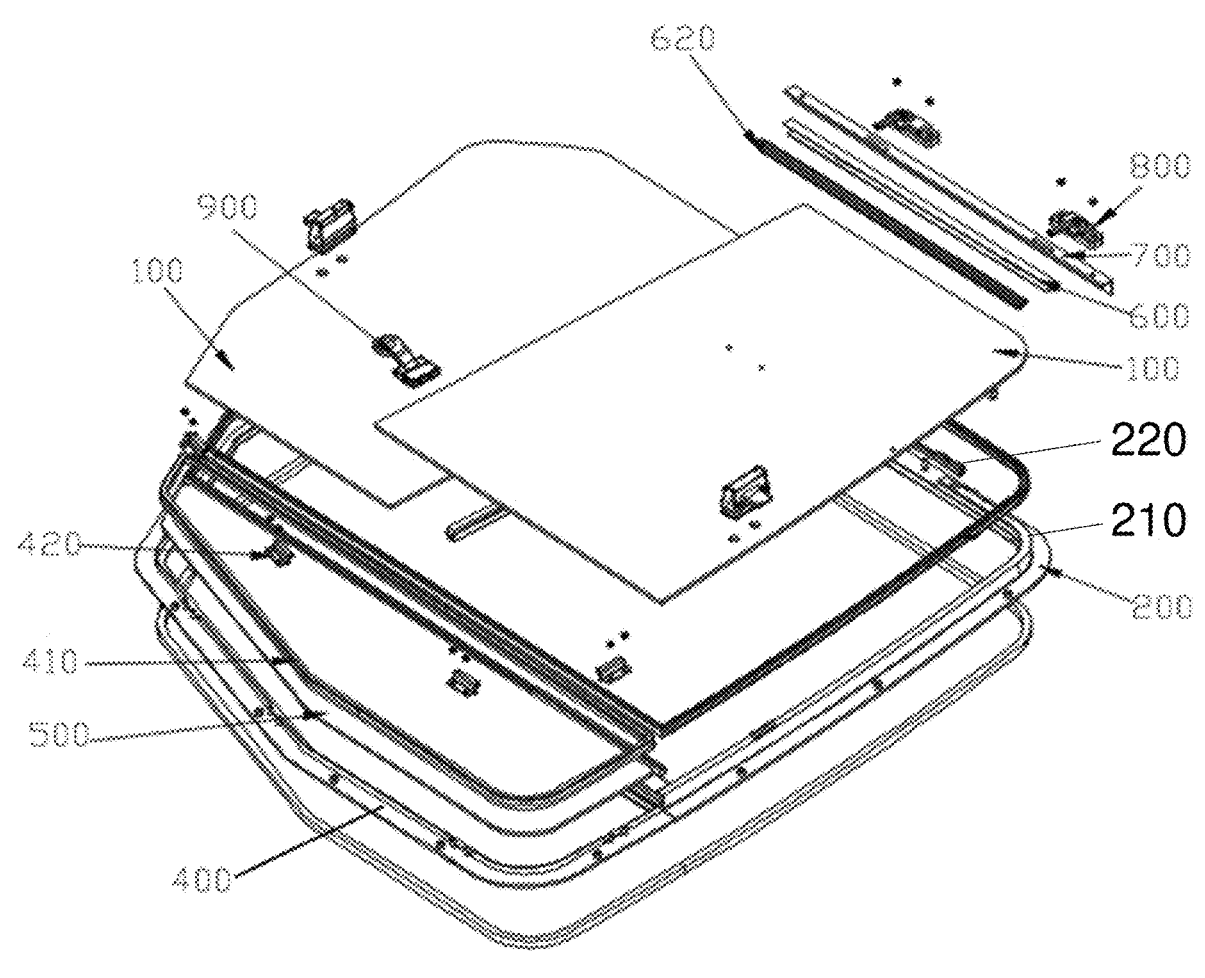
FIG. 3 is a perspective view of a quickly assembled and disassembled window frame structure in implementations of the present disclosure.
Figure 6:
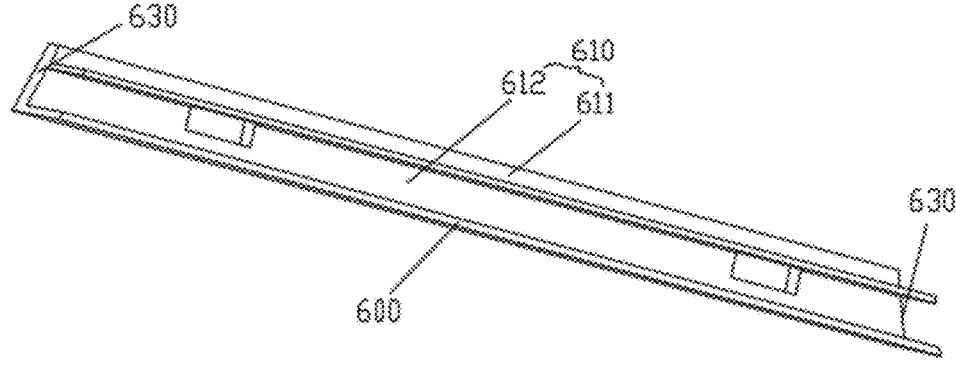
FIG. 6 is a schematic structural bottom view of a trim strip in implementations of the present disclosure.

Reference can be made to FIG. 1, FIG. 3, and FIG. 6 together. In an implementation, the quickly assembled and disassembled window frame structure further includes a trim strip 600. The trim strip 600 is disposed at one side of the cover plate 700 close to the glass sheet 100, and the trim strip 600 defines a sliding groove 610. When the cover plate 700 seals the notch 211, the sliding groove 610 communicates with the sliding space 213 at two ends of the sliding groove 610 to make the glass sheet 100 from the rail 210 to the sliding groove 610. Optionally, a length of the cover plate 700 in a sliding direction of the glass sheet 100 is greater than a length of the notch 211 in the sliding direction of the glass sheet 100, such that the cover plate 700 can better seal the notch 211. In the meanwhile, since the sliding groove 610 abuts against the sliding space 213 at the two ends of the sliding groove 610, the sliding groove 610 can communicate with the sliding space 213, and the end of the glass sheet 100 can slide from the sliding space 213 to the sliding groove 610. When the cover plate 700 is disassembled, the trim strip 600 is also disassembled, and the glass sheet 100 can be disassembled through the notch 211, which is convenient and quick, has a low operation difficulty and a high assembly-and-disassembly efficiency. In the meanwhile, when the glass sheet 100 in this implementation is mounted, the trim strip 600 is configured to re-abut against the sliding space 213 at the two ends of the trim strip 600 and communicates with the sliding space 213, and the cover plate 700 is configured to seal the notch 211, so no problems such as sliding stagnation, water leakage, and the like occur after the glass sheet 100 is mounted by the customer.

In this implementation, the latch 800 includes a base plate 810 and a face plate 820. A locking portion 830 is rotatably mounted between the base plate 810, the locking portion 830 is able to protrude beyond a lower side of the base plate and a lower side of the face plate when rotating downwards. The cover plate 700 and the trim strip 600 each define a locking hole 710 in fit with the locking portion 830. The locking hole in the cover plate is in locking fit with the locking portion 830. The trim strip is fixed when the cover plate is fixed. The locking hole in the trim strip is used for avoiding the locking portion 830. A handle 840 for controlling rotation of the locking portion 830 is mounted on the face plate 820. The locking portion 830 is connected with the handle 840 through a spring cylinder pin. The rotation of the locking portion 830 is controlled by rotating the handle. The locking portion 830 protrudes downwards when rotating downwards. The locking portion 830 is hidden between the base plate 810 and the face plate 820 when rotating upwards.

In this implementation, a spring lamination 850 located beside the locking portion 830 is further disposed between the base plate 810 and the face plate 820. The spring lamination is provided with a raised portion 851 at one side of the spring lamination 850 facing the locking portion 830. The locking portion 830 defines a limiting recess 831, and the limiting recess 831 is in fit with the raised portion to limit the rotation of the locking portion 830 after the locking portion 830 rotates in place. The locking portion 830 defines two limiting recesses 831, one of which is in fit with the raised portion of the spring lamination 850 when the locking portion 830 rotates downwards (i.e., the locking portion 830 is in a locking state), and the other of which is in fit with the raised portion of the spring lamination 850 when the locking portion 830 rotates upwards (i.e., the locking portion 830 is in an open state), so the handle is rotated hard to overcome an acting force of the spring lamination 850 to drive the locking portion 830 to rotate. The handle and the locking portion 830 always keep in the same direction. When the locking portion 830 is hidden between the base plate and the face plate, the latch is in the open state, the latch is separated from the cover plate and the trim strip, and the cover plate and the trim strip can be removed. When the locking portion 830 is perpendicular to each of the base plate and the face plate, the locking portion 830 protrudes downwards and is snapped into the locking hole of the cover plate and the locking hole of the trim strip, the latch is in the locking state, and the cover plate and the trim strip are locked and fixed by the latch and are not able to be removed, such that quick assembly and disassembly is realized and can be operated and completed by a single person.

Figure 10:
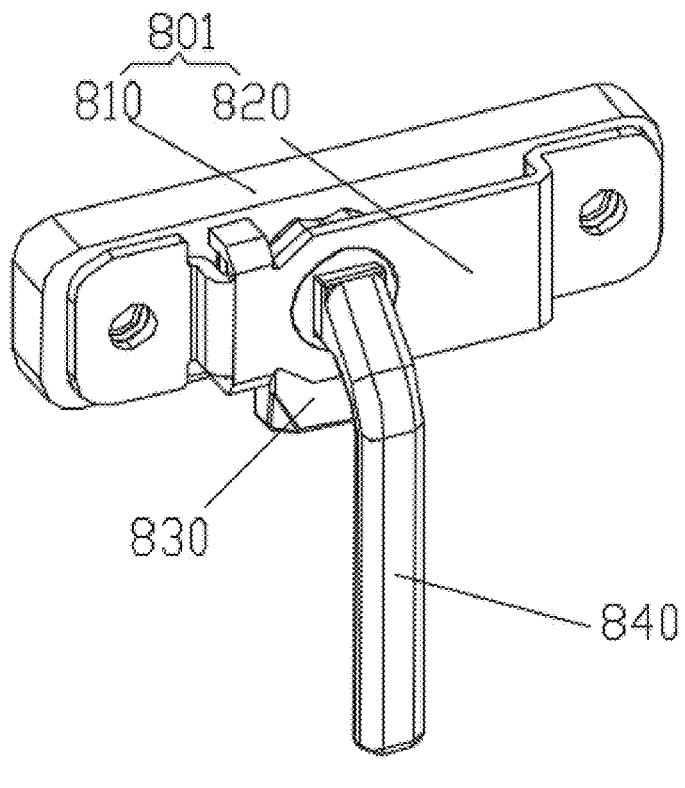
FIG. 10 is a schematic structural view of a latch in implementations of the present disclosure.
Figure 11:
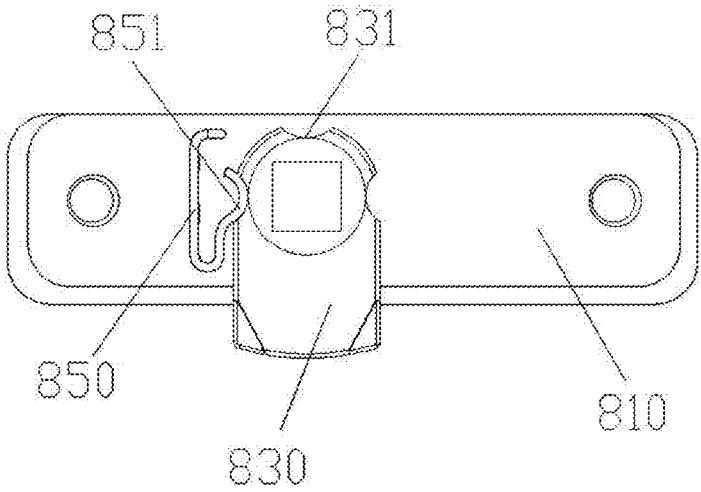
FIG. 11 is an inside schematic structural view of a latch in implementations of the present disclosure.

Reference can be made to FIG. 1 and FIG. 10 together. In an implementation, the quickly assembled and disassembled window frame structure further includes a latch 800. The latch 800 is operable in a locking state and an open state. The latch 800 includes a connecting portion 801, a locking portion 830, and a handle 840. The connecting portion 801 is connected with the upper frame 200. The locking portion 830 and the handle 840 are connected with the connecting portion 801. The cover plate 700 defines a locking hole 710 at one side of the cover plate 700 away from the glass sheet 100. The handle 840 is configured to switch the locking portion 830 between the locking state in which the locking hole 710 is disposed in the locking hole 710 and the opening state in which the locking hole 710 is disposed outside the locking hole 710. It can be understood that a sealing performance of the cover plate 700 needs to be ensured when the notch 211 is sealed by the cover plate 700.

Figure 8:
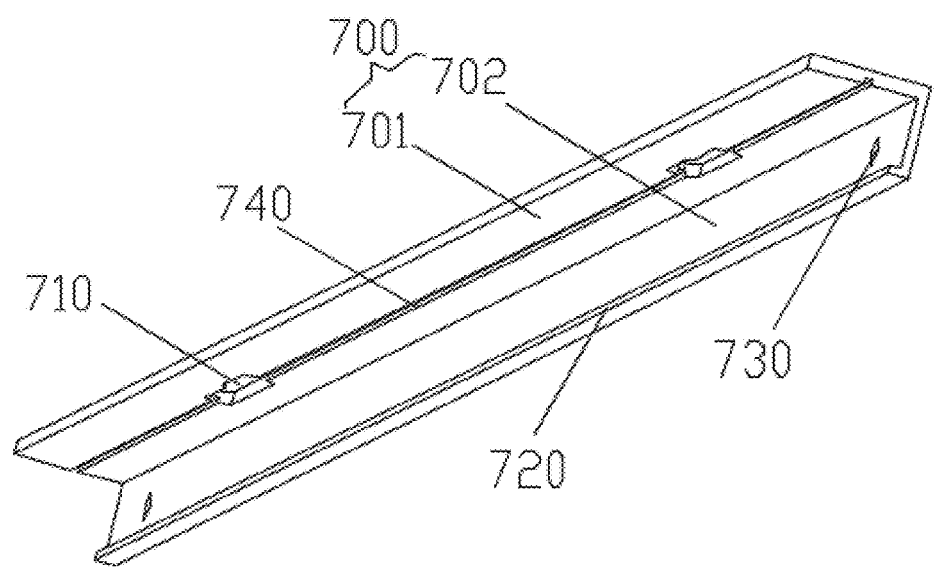
FIG. 8 is a schematic structural bottom view of a cover plate in implementations of the present disclosure.

Reference can be made to FIG. 1 and FIG. 8 together. Therefore, when the handle 840 enables the locking portion 830 to be disposed in the locking hole 710, the latch 800 is in the locking state. The cover plate 700 covers one side of the rail 210 away from the glass sheet 100, and the cover plate 700 can be locked on the rail 210 by the latch 800, such that a sealing effect of the cover plate 700 is prevented from being affected due to falling of the cover plate 700 or looseness of the cover plate 700 during the use of the quickly assembled and disassembled window frame structure, thereby further reducing water leakage. In the meanwhile, the cover plate 700 is fixed by the latch 800, such that no dislocation occurs at a connection between the cover plate 700 and the rail 210, thereby ensuring that the glass sheet 100 can smoothly slide between the cover plate 700 and the rail 210, and preventing sliding stagnation.

In an implementation, the locking portion 830 and the handle 840 each are rotatably connected with the connecting port 801, and an extending direction of the locking portion 830 and an extending direction of the handle 840 are the same. When the handle 840 rotates in a direction close to the cover plate 700, the locking portion 830 rotates towards the cover plate 700 into the locking hole 710. When the handle 840 rotates in a direction away from the cover plate 700, the locking portion 830 rotates away from the cover plate 700 and is separated from the locking hole 710. It can be understood that the latch 800 provided in this implementation uses the handle 840 to control the locking portion 830 to rotate together in a rotating manner, and the locking portion 830 is disposed in the locking hole 710 by rotation, such that a structure is simple, an operation is convenient for the customer, and a locking effect of the latch 800 can also be ensure.

Figure 9:
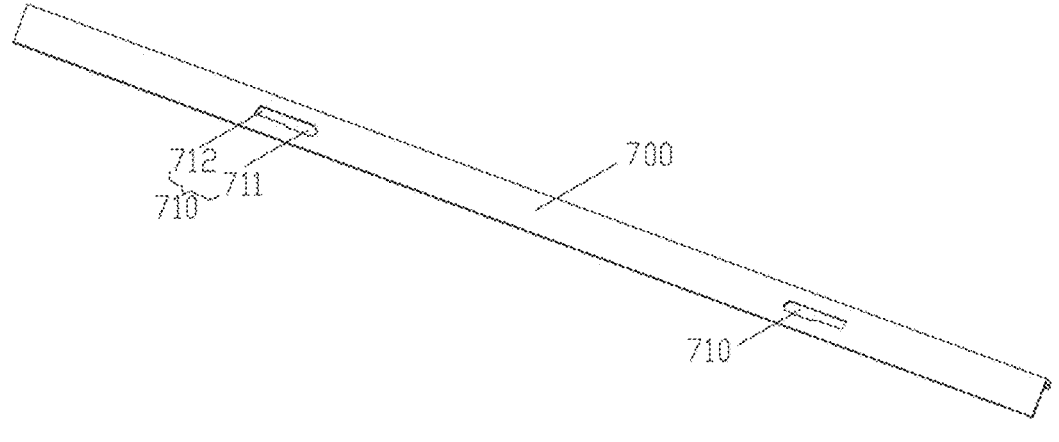
FIG. 9 is a schematic structural top view of a cover plate in implementations of the present disclosure.

Reference can be made to FIG. 9. In an implementation, the locking hole 710 includes a first locking sub-hole 711 and a second locking sub-hole 712 communicating with the first locking sub-hole 711. The first locking sub-hole 711 has a hole size larger than the second locking sub-hole 712. When the locking portion 830 rotates towards the cover plate 700 to enter the locking hole 710, the locking portion 830 is configured to rotate to the second locking sub-hole 712 through the first locking sub-hole 711. It can be understood that the first locking sub-hole 711 has the hole size larger than the second locking sub-hole 712, and the locking portion 830 is configured to rotate to the second locking sub-hole 712 through the first locking sub-hole 711, such that the locking portion 830 can be ensured to enter the locking hole 710 successfully in virtue of the first locking sub-hole 711 with a larger size, and a locking effect of the locking portion 830 can be ensured in virtue of the second locking sub-hole 712 with a smaller size, thereby further improving the locking effect of the latch 800.

In this implementation, the cover plate 700 has a L-shaped cross section. The cover plate 700 is provided with a snap-fit portion 720 at a lower side of the cover plate 700. The snap-fit portion 720 is configured to limit an up-and-down position of the trim strip. The snap-fit portion 720 is configured to limit up-and-down movement of the trim strip after the snap-fit portion 720 is assembled with the trim strip.

The cover plate 700 defines a limiting groove 740 on the top and inside of the cover plate 700, and the limiting groove 740 is configured to limit a left-and-right position of the trim strip. The trim strip 600 is provided with a rib 640 in fit with the limiting groove 740. Two ends of the cover plate 700 are carried on ends of the rail 210 at two ends of the notch. Rivets 750 are fixedly connected with the ends of the rail 210. The two ends of the cover plate define rivet holes 730 in fit with the rivets 750 respectively. The rivet holes of the cover plate are in fit with the rivets respectively, such that a front-and-back position of the cover plate is positioned, and a position of the cover plate is ensured to be stable. The locking hole in the cover plate 700 has two sections with different widths. A narrower section and a wider section are transited through an inclined surface, and the locking portion that rotates downwards is snap-fitted into the narrower section. When the locking portion rotates downwards, the locking portion slides to the narrower section of the locking hole of the cover plate through the wider section of the locking hole of the cover plate to press the cover plate, and then the cover plate presses the trim strip.

Figure 7:
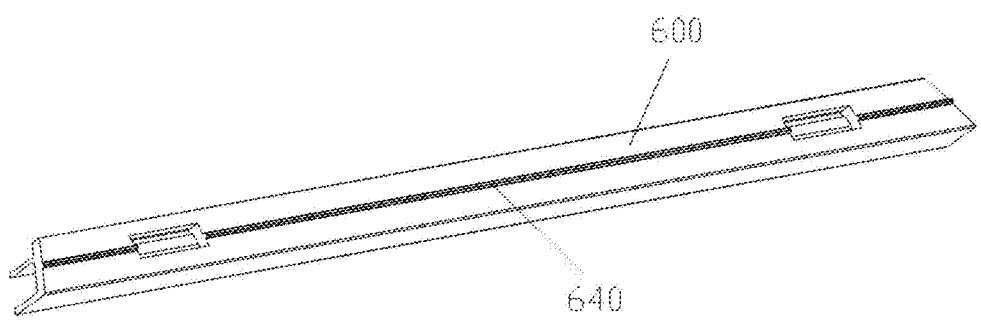
FIG. 7 is a schematic structural top view of a trim strip in implementations of the present disclosure.

Reference can be made to FIG. 7 and FIG. 8 together. In an implementation, the cover plate 700 includes a first sub-cover plate 701 and a second sub-cover plate 702 that are connected in a bent manner. The first sub-cover plate 701 is configured to cover one side of the notch 211 away from the glass sheet 100. The first sub-cover plate 701 defines a limiting groove 740 at one side of the first sub-cover plate 701 close to the third strip 600. The third strip 600 is provided with a rib 640 at one side of the trim strip close to the first sub-cover plate 701. The rib 640 is disposed in the limiting groove 740. The second sub-cover plate 702 is configured to cover one side of the notch 211 away from the upper frame 200. The second sub-cover plate 702 is provided with a snap-fit portion 720 at one end of the second sub-cover plate 702 away from the first sub-cover plate 701. The snap-fit portion 720 extends towards the upper frame 200. The snap-fit portion 720 is configured to abut against one side of the trim strip 600 away from the first sub-cover plate 701. It can be understood that when the rib 640 is disposed in the limiting groove 740, the trim strip 600 can be limited to move towards or away from the upper frame 200, and the snap-fit portion 720 can prevent the trim strip 600 from moving up and down, thereby realizing a stable connection between the trim strip 600 and the cover plate 700, such that overall structural stability of the quickly assembled and disassembled window frame structure is ensured, and no problems such as sliding stagnation, water leakage, and the like occur after the cover plate 700 is mounted.

In this implementation, the trim strip 600 has a F-shaped cross section. The trim strip 600 defines two sliding grooves 610 at a lower side of the trim strip 600, and two pieces of glass sheet are guided to move through the two sliding grooves respectively. The two sliding grooves of the trim strip 600 include a first sliding sub-groove 611 and a second sliding sub-groove 612 that are arranged side by side in a direction away from the upper frame 200. A sliding groove of the trim strip 600 communicates with a sliding groove of the rail 210. In this implementation of the present disclosure, the sliding groove of the rail 210 is the sliding space 213 of the rail 210, and the rail 210 defines a first sliding sub-space 2131 and a second sliding sub-space 2132 that are arranged side by side in the direction away from the upper frame 200. In the meanwhile, two ends of the trim strip 600 abut against the ends of the rail 210 at two ends of the notch 211, such that a front-and-back position of the trim strip 600 is limited.

The two ends of the trim strip 600 are designed to have oblique angles 630 respectively, and the trim strip 600 is trapezoidal as a whole. The ends of the rail 210 corresponding to the notch 211 are designed to have reverse oblique angles 212 respectively, and the reverse oblique angles 212 are matched with the oblique angles 630 of the trim strip 600 respectively. In other words, the notch 211 away from the upper frame 200 has an opening size larger than the notch 211 close to the upper frame 200, which facilitates assembly and disassembly of the trim strip 600. The trim strip 600 is a plastic part, which can reduce the weight of the sliding window. During specific implementation, the trim strip 600 and the cover plate may also be made of aluminum profiles and be integrated.

Figure 12:
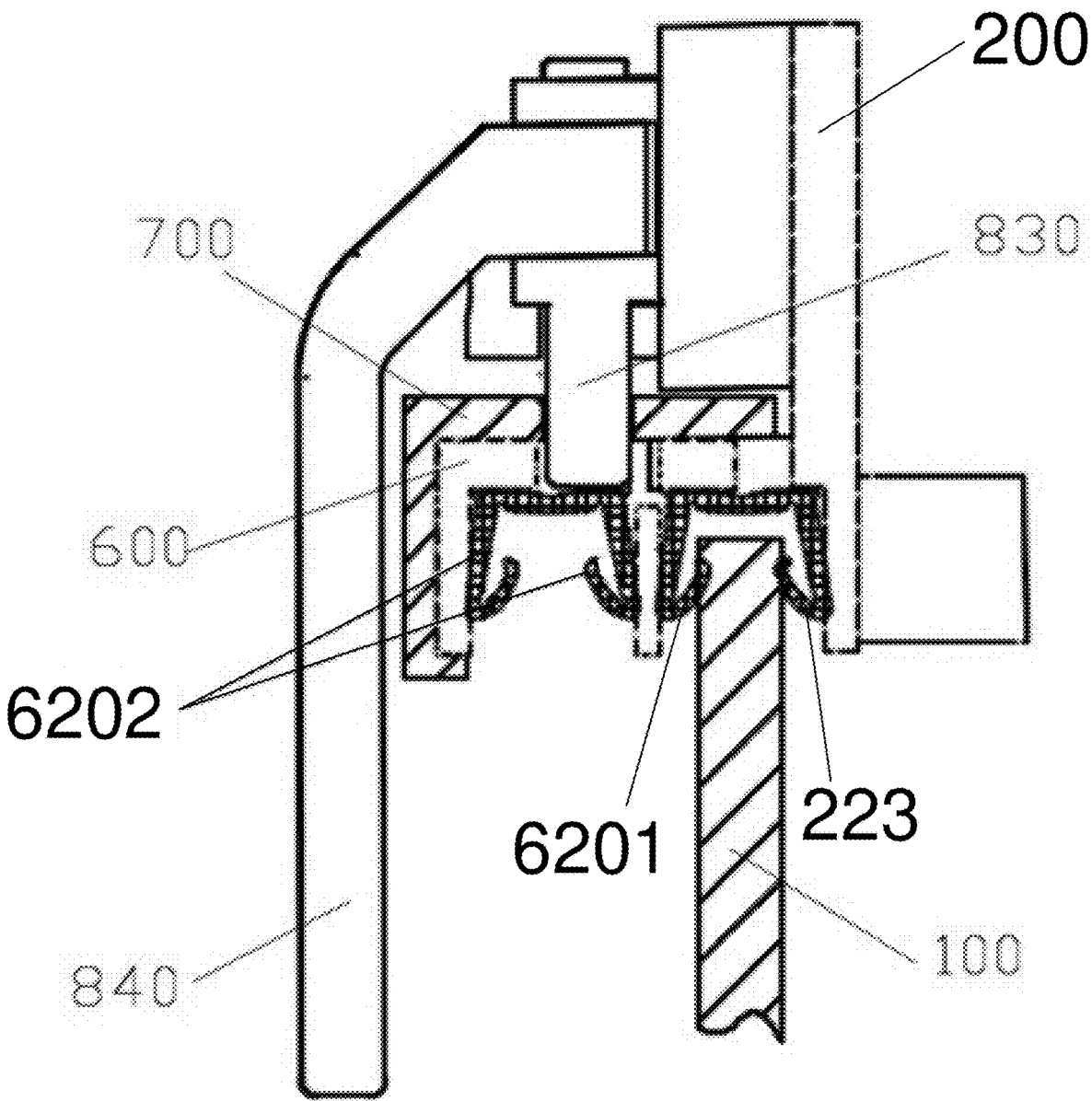
FIG. 12 is a cross-sectional view of a latch in use in implementations of the present disclosure.
Figure 13:
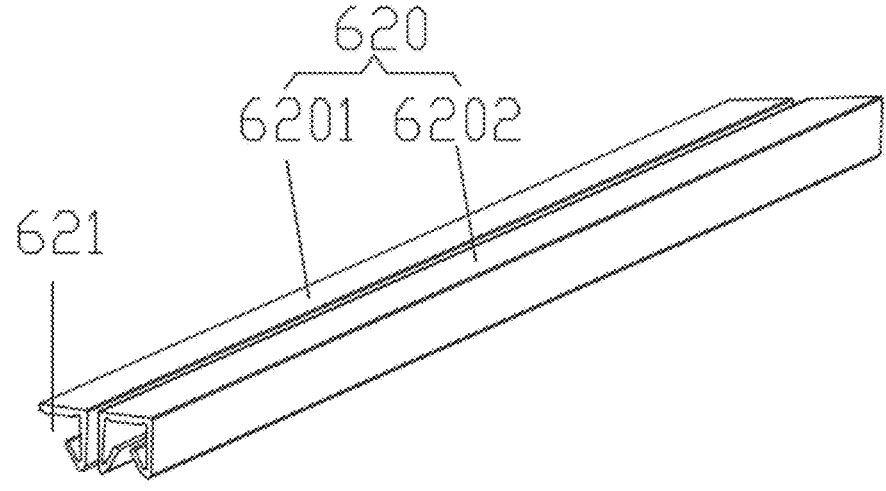
FIG. 13 is a schematic structural view of a secondary gasket in implementations of the present disclosure.

Reference can be made to FIG. 5, FIG. 6, and FIG. 12 together. In an implementation, the notch 211 away from the upper frame 200 has an opening size larger than the notch 211 close to the upper frame 200. Optionally, the notch 211 away from the upper frame 200 has the opening size larger than the notch 211 close to the upper frame 20, which may be understood as that two ends of the rail 210 corresponding to the notch 211 are designed to have oblique angles and an oblique opening faces one side away from the notch 211, or the opening size of the notch 211 away from the upper frame 200 is larger. It can be understood that the glass sheet 100 needs to be repeatedly assembled or disassembled through the notch 211 during assembly and disassembly of the glass sheet 100, such that when the notch 211 away from the upper frame 200 has the opening size larger than the notch 211 close to the upper frame 20, the glass sheet 100 can be conveniently assembled or disassembled by the customer, the glass sheet 100 can be conveniently replaced and cleaned by the customer regularly, and requirements of assembly, disassembly, cleaning, and maintenance with high frequency can be met.

In an implementation, the quickly assembled and disassembled window frame structure further includes a main gasket 220 and a secondary gasket 620. Part of the main gasket 220 is disposed in the sliding space 213. The secondary gasket 620 is disposed in the sliding groove 610. When the cover plate 700 seals the notch 211, the secondary gasket 620 is configured to abut against the main gasket 220 at two ends of the secondary gasket 620. It can be understood that the end of the glass sheet 100 provided in this implementation is disposed in the main gasket 220, and the part of the main gasket 220 is disposed in the sliding space 213, such that the glass sheet 100 can also be disposed in the sliding space 213.

Optionally, when the secondary gasket 620 abuts against the main gasket 220 at the two ends of the secondary gasket 620, the secondary gasket 620 communicates with the main gasket 220, and the glass sheet 100 can slide from the main gasket 220 to the secondary gasket 620. Since the secondary gasket 620 is disposed in the sliding groove 610, the trim strip 600 and the secondary gasket 620 can be disassembled together when the cover plate 700 is disassembled, and the glass sheet 100 can be removed from the notch 211, thereby effectively improving the assembly-and-disassembly efficiency. In the meanwhile, since the glass sheet 100 is disposed in the sliding space 213 through the main gasket 220 or disposed in the sliding groove 610 through the secondary gasket 620, a gap between the glass sheet 100 and the sliding space 213 or a gap between the glass sheet 100 and the sliding groove 610 can be reduced, friction can be reduced, and problems such as sliding stagnation, water leakage, and the like can be further prevented.

Reference can be made to FIG. 6. In this implementation, the trim strip 600 is an injection-molded part, which can reduce the weight of the sliding window. The trim strip 600 has a F-shaped cross section. Two main gaskets 220 are embedded in the rail 210 on the upper frame of the sliding window. In other words, the two main gaskets 220 include a first main sub-gasket 2201 and a second main sub-gasket 2202. Two secondary gaskets 620 are embedded in the sliding groove of the trim strip 600. In other words, the two secondary gaskets 620 include a first secondary sub-gasket 6201 and a second secondary sub-gasket 6202. The main gasket 220 and the secondary gasket 620 each are made of ethylene propylene diene monomer (EPDM), and an inner surface of the main gasket 220 and an inner surface of the secondary gasket 620 each are sprayed with sliding agents or flock. The gasket is configured to assist the glass sheet to slide and plays a sealing role. An inner main gasket defines an absent section 221 that is matched with an inner secondary gasket on the trim strip 600. In this implementation, the inner main gasket is the second main sub-gasket 2202, and the inner secondary gasket on the trim strip 600 is the second secondary sub-gasket 6202. An outer secondary gasket on the trim strip 600 has a width that is cut by ¼ from the outside to define an absent portion 621. An outer main gasket has a width that is cut by ¾ from the inside to define a notch section 222, and the notch section 222 is matched with the outer secondary gasket on the trim strip 600. In this implementation, the outer main gasket is the first main sub-gasket 2201, and the outer secondary gasket is the first secondary sub-gasket 6201. "Inner" refers to an opening direction of the notch 211, and "outer" refers to a direction opposite to the opening direction of the notch 211. Two ends of the secondary gasket 620 on the trim strip 600 are designed to have oblique angles that are flush with the two ends of the trim strip 600. Two ends of each of the absent section and the notch section in the main gasket 220 are designed to have reverse oblique angles that are flush with the two ends of the rail 210 at the two ends of the notch. In virtue of this structure of the secondary gasket 620, a single piece of glass sheet can be disassembled, which greatly reduces an operation difficulty and makes single-person operation possible. On condition that a single-person disassembly function is realized, a remaining ¼ width of the outer main gasket after the outer main gasket defines the notch section fills a cut part of the outer secondary gasket of the trim strip 600. In addition, the outer secondary gasket and the outer main gasket form an integrated structure, such that a waterproof performance of the window frame cannot be reduced, and no water seepage occurs in the rain. A gasket oblique angle at a cut position of the main gasket is in contact with a body, such that no wrinkling and curling of the gasket occur during sliding, and sliding is not interfered.

Reference can be made to FIG. 5 and FIG. 6 together. In an implementation, the rail 210 defines a first sliding sub-space 2131 and a second sliding sub-space 2132 that are arranged side by side in a direction away from the upper frame 200. The main gasket 220 includes a first main sub-gasket 2201 and a second main sub-gasket 2202. Part of the first main sub-gasket 2201 is disposed in the first sliding sub-space 2131. The second main sub-gasket 2202 is disposed in the second sliding sub-space 2132. The sliding groove 610 has a first sliding sub-groove 611 and a second sliding sub-groove 612 that are arranged side by side in the direction away from the upper frame 200. The second secondary gasket 620 includes a first secondary sub-gasket 6201 and a second secondary sub-gasket 6202. The first secondary sub-gasket 6201 is disposed in the first sliding sub-groove 611. The second secondary sub-gasket 6202 is disposed in the second sliding sub-groove 612. When the cover plate 700 seals the notch 211, the first secondary sub-gasket 6201 is configured to abut against the first main sub-gasket 2201 at two ends of the first secondary sub-gasket 6201, and the second secondary sub-gasket 6202 is configured to abut against the second main sub-gasket 2202 at two ends of the second secondary sub-gasket 6202.

Reference can be made to FIG. 1, FIG. 3, FIG. 5, and FIG. 6 together. Optionally, the glass sheet 100 includes a first sub-glass sheet 110 and a second sub-glass sheet 120. In this implementation, the first sub-glass sheet 110 is disposed in the first main sub-gasket 2201, the first sub-glass sheet 110 can slide from the first main sub-gasket 2201 to the first secondary sub-gasket 6201, the second sub-glass sheet 120 is disposed in the second main sub-gasket 2202, and the second sub-glass sheet 120 can slide from the second main sub-gasket 2202 to the second secondary sub-gasket 6202, such that the first sub-glass sheet 110 and the second sub-glass sheet 120 are arranged in a staggered manner. In the meanwhile, since the notch 211 penetrates through the two opposite surfaces of the upper frame 200 and is away from the surface of the rail 210 where the upper frame 200 is disposed, both the first sub-glass sheet 110 and the second sub-glass sheet 120 can be disassembled from the notch 211, such that a complex assembly and disassembly operation is reduced, an operation difficulty is low, and glass sheet 100 is conveniently replaced and cleaned by the customer regularly.

Figure 4:
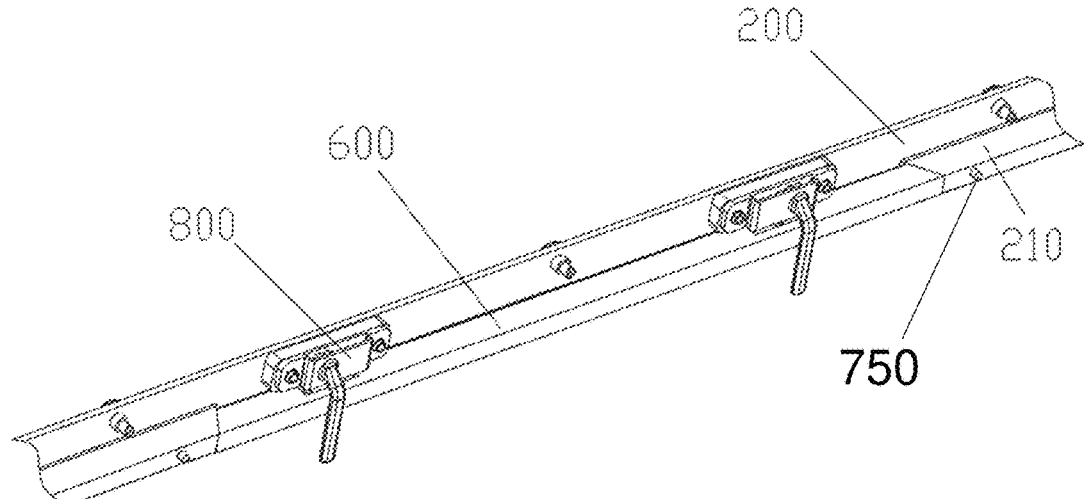
FIG. 4 is a partial perspective view of a quickly assembled and disassembled window frame structure with a cover plate omitted in implementations of the present disclosure.
Figure 5:
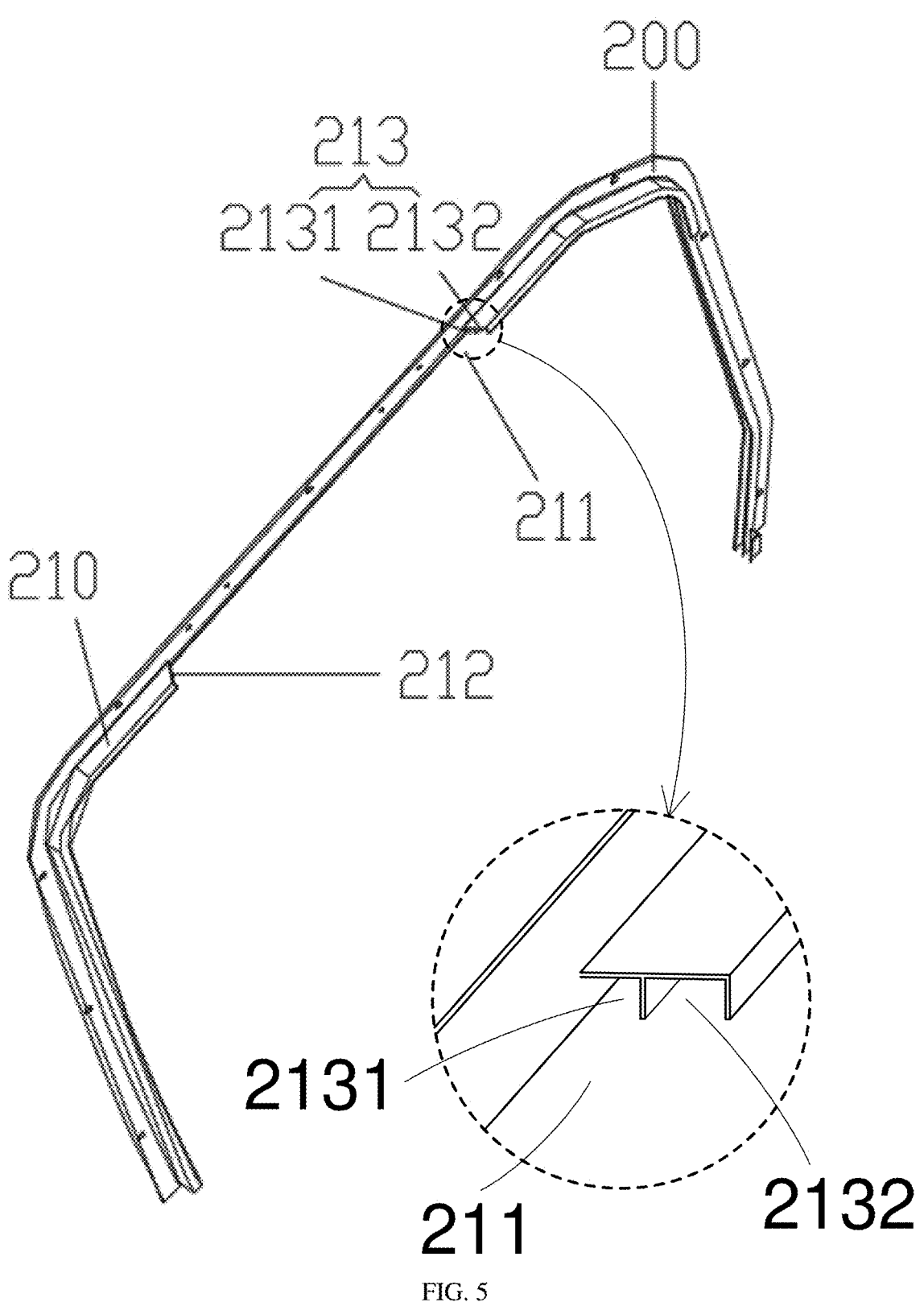
FIG. 5 is a schematic structural view of an upper frame in implementations of the present disclosure.
Figure 14:
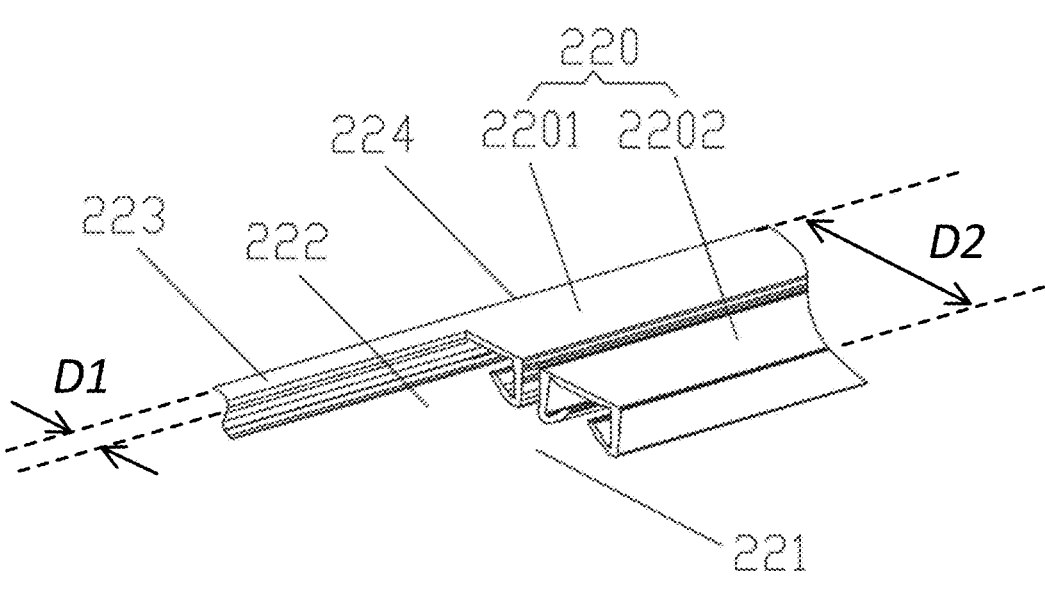
FIG. 14 is a partial schematic structural view of a main gasket in implementations of the present disclosure.

Reference can be made to FIG. 3, FIG. 4, and FIG. 14 together. In an implementation, the main gasket 220 includes a sliding section 224 and a sealing section 223. The sliding section 224 is disposed in the sliding space 213. The sealing section 223 has two ends connected with the sliding section 224. The sealing section 223 is attached to the upper frame 200 and exposed beyond the notch 211. A vertical distance D1 between a surface of the sealing section 223 away from the upper frame 200 and the upper frame 200 is less than a vertical distance D2 between a surface of the sliding section 224 away from the upper frame 200 and the upper frame 200. When the cover plate 700 seals the notch 211, the secondary gasket 620 is configured to abut against the main gasket 220 at the two ends of the secondary gasket 620. It can be understood that the sealing section 223 is attached to the upper frame 200 and is exposed beyond the notch 211, which may be understood as that the sealing section 223 is disposed in the notch 211 and is attached to the upper frame 200. The two ends of the sealing section 223 are connected with the sliding section 224 to make the main gasket 220 integrated, so the upper frame 200 is not exposed beyond the notch 211 due to disassembly of the cover plate 700. When the cover plate 700 seals the notch 211, the sealing section 223 can also seal an interface between the upper frame 200 and the cover plate 700, thereby effectively preventing external liquid from entering via the interface between the upper frame 200 and the cover plate 700, effectively coping with severe weather such as rain, snow, etc., and improving practicability of quickly assembled and disassembled window frame structure.

In this implementation, an inner movable glass sheet is mounted with a friction lock 900 at a side edge of the inner movable glass sheet. The friction lock 900 includes a support tray 910 and a grip 920. The support tray 910 is fixedly connected with the side edge of the inner movable glass sheet. The grip 920 is articulated with the support tray via a pin. The support tray 910 defines a slot 911 into which the side edge of the movable glass sheet is snapped. The slot

911 and the glass sheet may be fixed by adhesive. The grip 920 is provided with a pressing portion 921 at one side of an articulated end of the grip 920, and the pressing portion 921 is able to press an outer movable glass sheet by swinging the grip. The pressing portion 921 is provided with a friction strip 930 for abutting against an inner side surface of the outer movable glass sheet. The pressing portion 921 of the grip 920 defines a strip-shaped slot, and the friction strip is embedded in the strip-shaped slot. The friction lock implements a stopper function mainly by means of a contact friction force between the friction strip and the movable glass sheet, such that the movable glass sheet can stop at any position. In other words, the movable glass sheet can stop when the handle is in a press-down state, and the movable glass sheet can move when the handle is in a swing-up state.

Figure 15:
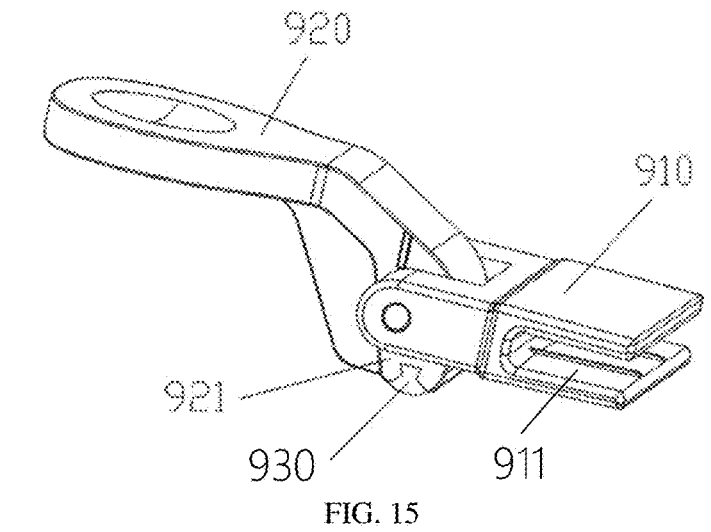
FIG. 15 is a schematic structural view of a friction lock in implementations of the present disclosure.
Figure 16:
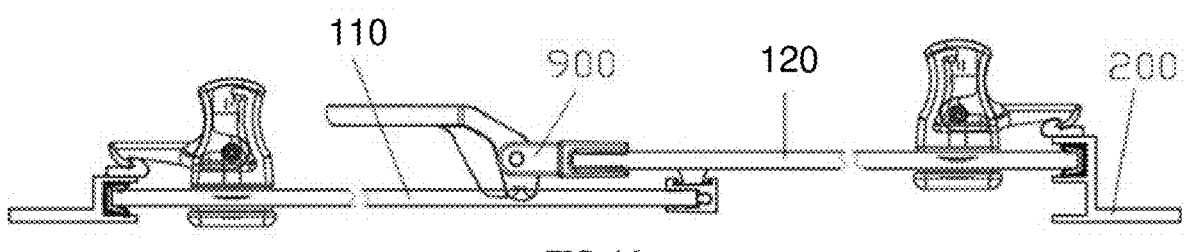
FIG. 16 is a schematic view of a friction lock in use in implementations of the present disclosure.
Figure 17:
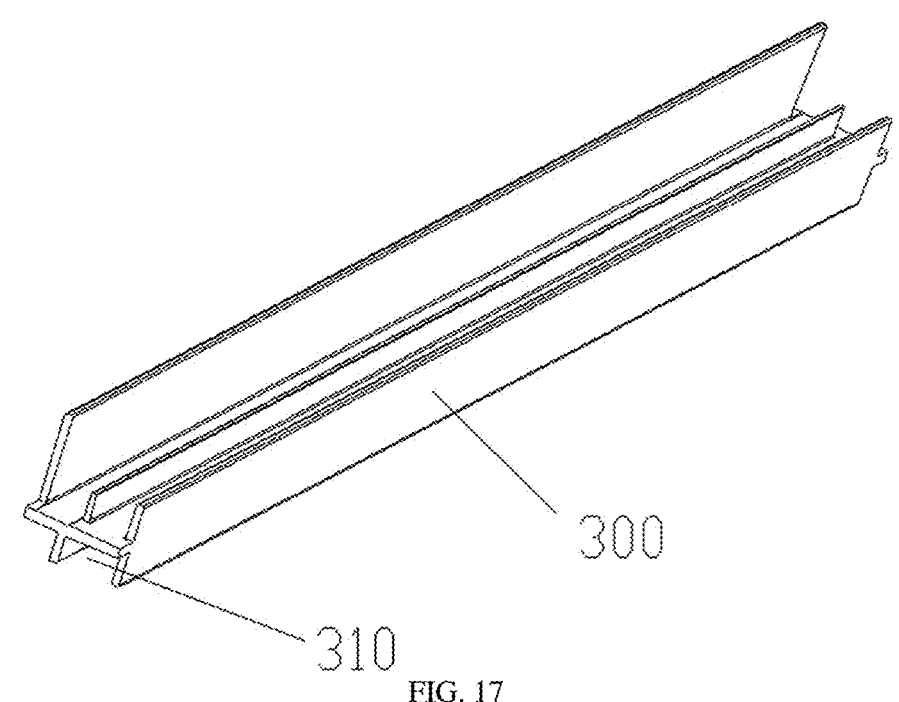
FIG. 17 is a schematic structural view of a cross member in implementations of the present disclosure.

Reference can be made to FIG. 1, FIG. 15, and FIG. 16 together. In an implementation, the quickly assembled and disassembled window frame structure further includes a friction lock 900. The friction lock 900 includes a support tray 910, a grip 920, and a pressing portion 921. The glass sheet 100 includes a first sub-glass sheet 110 and a second sub- glass sheet 120. The first sub-glass sheet 110 has one end disposed in a first sliding sub-space 2131. The second sub-glass sheet 120 has one end disposed in the second sliding sub-space 2132. The support tray 910 is disposed at one end of the second sub- glass sheet 120 close to the first sub-glass sheet 110. The pressing portion 921 is connected with the grip 920 and faces the first sub-glass sheet 110. The grip 920 is configured to control the pressing portion 921 to move towards the first sub- glass sheet 110 to make the pressing portion 921 press the first sub-glass sheet 110.

Optionally, in this implementation, the first sub- glass sheet 110 and the second sub- glass sheet 120 are arranged in the sliding space 213 in a staggered manner. Here, since the support tray 910 is disposed at one end of the second sub-glass sheet 120 close to the first sub- glass sheet 110, and the grip 920 can control the pressing portion 921 to move towards the first sub-glass sheet 110, when the pressing portion 921 abuts against the first sub-glass sheet 110, a friction force between the pressing portion 921 and the first sub- glass sheet 110 increases, the first sub-glass sheet 110 and the second sub-glass sheet 120 are difficult to move in a staggered manner, thereby realizing an effect of fixing the first sub-glass sheet 110 and the second sub- glass sheet 120. Therefore, the friction lock 900 provided in this implementation can keep the first sub-glass sheet 110 and the second sub-glass sheet 120 stable, prevent the first sub-glass sheet 110 and the second sub-glass sheet 120 from moving during assembly and disassembly or using of the quickly assembled and disassembled window frame structure, and improve the overall structural stability of the quickly assembled and disassembled window frame structure. In this implementation, the sliding-window upper frame includes a lower cross member 300 and an upper frame 200 located above the cross member. A lower frame 400 is disposed below the cross member 300. The lower frame 400 and the cross member 300 constitute a fixed-window lower frame, within which a fixed glass sheet 500 is mounted. A weather strip 510 is bonded to a periphery of the fixed glass sheet 500. The fixed glass sheet 500 and the weather strip 510 are assembled and disassembled as a whole. The fixed glass sheet 500 and the weather strip 510 are bonded together by 3M adhesive to improve a sealing performance of the strip.

In this implementation, part of the weather strip 510, into which an edge of the fixed glass sheet 500 is snapped, has a U-shaped structure. The U-shaped adhesive or cloth butyl adhesive at the groove bottom of the U-shaped structure, so as to improve the sealing performance of the strip. A sharp corner of the outer side of the weather strip is joined by injection molding to form a closed structure, such that variables such as a surface difference are reduced, thereby improving the structural sealing performance and water resistance between the fixed glass sheet 500 and the weather strip 510. The U-shaped structure provided in this implementation may be understood as a carrier portion 511 with an opening opposite to the accommodation space 401, and a sealing portion 512 is disposed at one side of the carrier portion 511. The lower frame has a T-shaped cross section. The lower frame 400 is provided with a limiting frame strip 410, and the limiting frame strip 410 is configured to block an outer side of a fixed glass sheet 500. The cross member 300 defines a U-shaped groove 310 at a lower side of the cross member 300, and the weather strip 510 on the upper side of the fixed glass sheet 500 is mounted in the U-shaped groove 310.

Figures 18, 19:
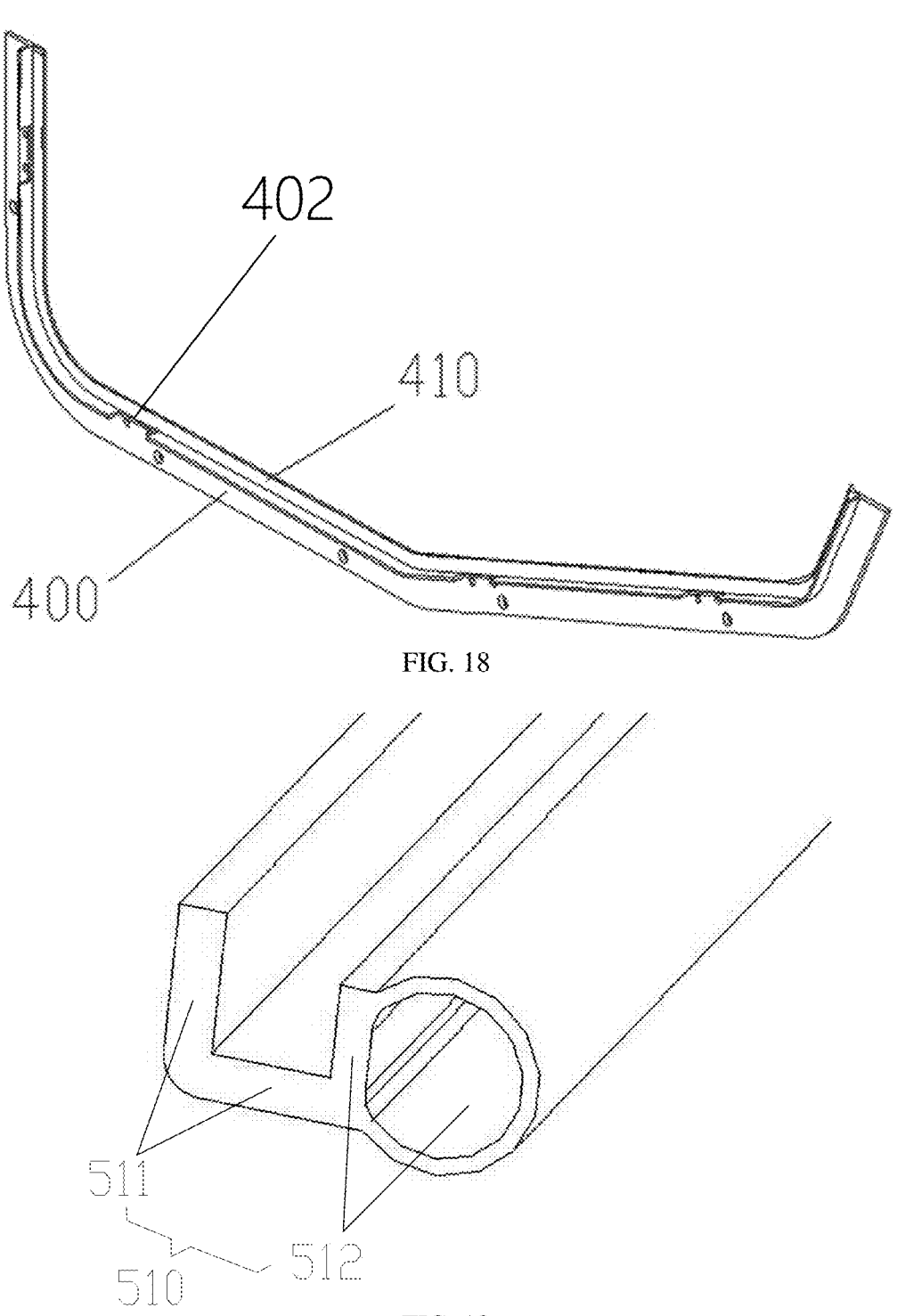
FIG. 18 is a schematic structural view of a lower frame in implementations of the present disclosure.
FIG. 19 is cross-sectional view of a weather strip in implementations of the present disclosure.
Figure 20:
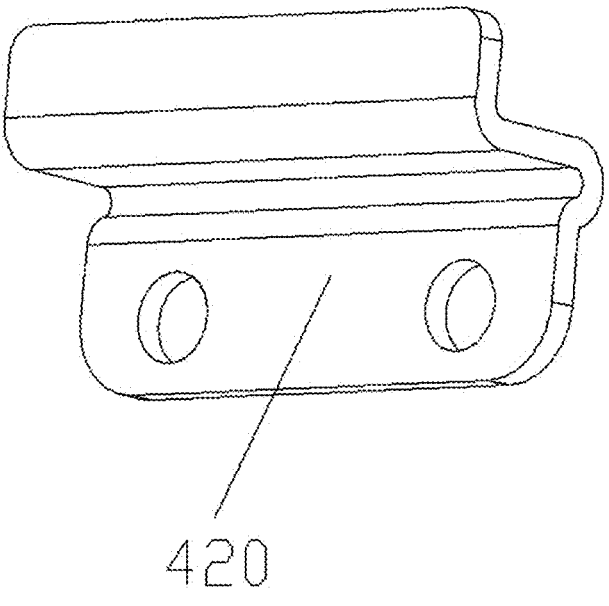
FIG. 20 is a schematic structural view of a fastener in implementations of the present disclosure.
Figure 21:
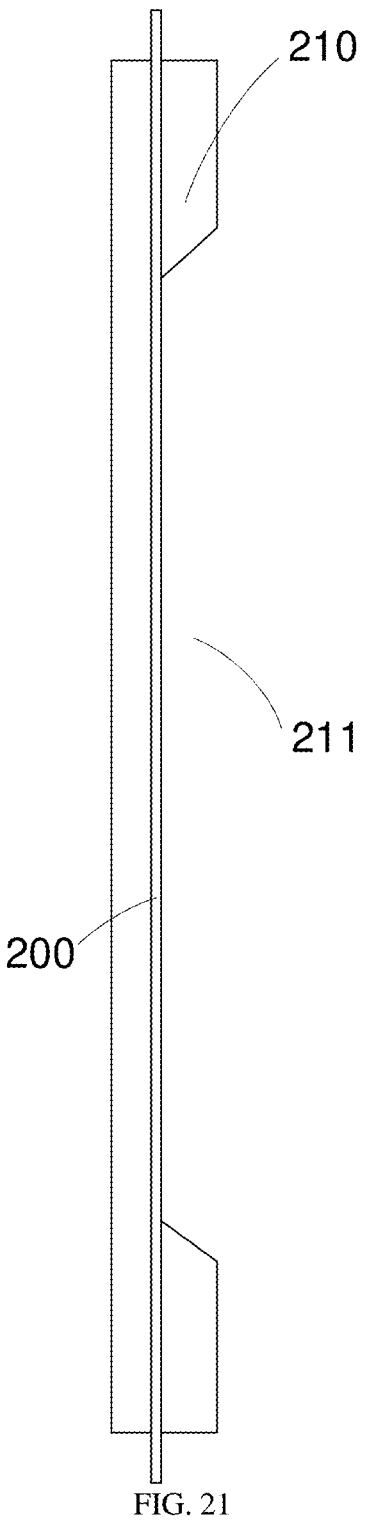
FIG. 21 is a schematic top view of the structure illustrated in FIG. 5.

Reference can be made to FIG. 1 and FIG. 19 together. In an implementation, the quickly assembled and disassembled window frame structure further includes a lower frame 400, a cross member 300, a fixed glass sheet 500, and a weather strip 510. The cross member 300 is connected with the upper frame 200 and the lower frame 400 and is configured to separate the upper frame 200 from the lower frame 400. The lower frame 400 and the cross member 300 cooperatively define an accommodation space 401. The weather strip 510 includes a carrier portion 511 and a sealing portion 512. The carrier portion 511 surrounds the accommodation space 401. The fixed glass sheet 500 has one end disposed in the carrier portion 511. The sealing portion 512 is disposed at one side of the carrier portion 511. The sealing portion 512 is configured to seal a peripheral surface of the fixed surface.

Optionally, the carrier portion 511 surrounds the accommodation space 401, the end of the fixed glass sheet 500 is disposed in the carrier portion 511, and the sealing portion 512 is disposed at one side of the carrier portion 511, such that the sealing portion 512 also surrounds the end of the fixed glass sheet 500. Here, the sealing portion 512 is configured to seal the peripheral surface of the fixed glass sheet 500. Regarding the weather strip 510 provided in the present disclosure, not only can the fixed glass sheet 500 be carried, but also the sealing portion 512 can be utilized to seal the peripheral surface of the fixed glass sheet 500, thereby ensuring that no functional problems such as water leakage and the like occur after the assembly and disassembly operation is carried out by the customer.

Further optionally, the carrier portion 511 provided in this implementation has a U- shaped structure with an opening opposite to the accommodation space 401. Since the carrier portion 511 surrounds the accommodation space 401, the end of the fixed glass sheet 500 can be accommodated in the U-shaped structure, and the fixed glass sheet 500 is disposed in the accommodation space 401.

In this implementation, multiple fasteners 420 pressing an inner side of the fixed glass sheet 500 are connected with the lower frame 400 through screws. The lower frame defines notch slots 402 for mounting the fasteners. The screws are pressure riveting screws. When the fixed glass sheet 500 is assembled, an upper edge of the fixed glass sheet 500 together with the weather strip are inserted into the U-shaped groove of the cross member 300, and then the fixed glass sheet 500 is placed flat. After the fasteners are mounted, the fasteners are locked by pressure riveting nuts, and then assembly is completed. The U-shaped groove structure of the cross member 300 can ensure that the fixed glass sheet 500 does not fall down after the pressure riveting nuts of the fasteners are all loosened, such that the operation can be carried out by a single person.

Reference can be made to FIG. 1 and FIG. 8 together. In an implementation, the quickly assembled and disassembled window frame structure further includes at least one fastener 420. The lower frame 400 defines at least one notch slot 402 penetrating through a surface of the lower frame 400 close to the fixed glass sheet 500. Each of the at least one fastener 420 has one end disposed in each of the at least one notch slot 402, and has another end connected with the carrier portion 511 to press the fixed glass sheet 500. It can be understood that one end of the fastener 420 is disposed in the notch slot 402 of the lower frame 400, such that the fixed glass sheet 500 can be pressed by the fastener 420, and an overall space of the quickly assembled and disassembled window frame structure can be reduced. In the meanwhile, the fixed glass sheet 500 can also be disassembled for replacement by disassembling the fastener 420, such that the fixed glass sheet 500 is conveniently replaced and cleaned by the customer regularly.

Unless otherwise stated, if any of the above-mentioned technical solutions disclosed in the present disclosure discloses a numerical range, then the disclosed numerical range is a preferred numerical range. Those skilled in the art should understand that the preferred numerical range only includes values that are obvious and representative for the technical effect among the many feasible values. Since a large number of numerical values cannot be exhaustively listed, the present disclosure discloses some numerical values to illustrate the technical solutions of the present disclosure. Moreover, the above-listed numerical values should not limit the scope of the present disclosure.

If the present disclosure discloses or involves components or structural components that are fixedly connected with each other, unless otherwise stated, a fixed connection may be understood as a fixed connection that can be detached (e.g., bolt connection and screw connection). It can also be understood as a non-detachable fixed connection (e.g., riveting and welding). The mutual fixed connection may also be replaced by an integrated structure (e.g., manufactured integrally by a casting process) (except obviously the situation that the integrated forming process cannot be used).

In addition, unless otherwise stated, the terms in any of the technical solutions disclosed of the present disclosure used to indicate a positional relationship or shape have the meanings including a state or a shape that is identical to, similar to, or close to the terms.

Any component provided in the present disclosure may be assembled by multiple individual parts, or may include a single component manufactured by the integral forming process.

Finally, it should be noted that the above implementations are only used to illustrate the technical solutions of the present disclosure and not to limit them. Although the present disclosure has been described in detail with reference to the preferred implementations, those of ordinary skill in the art should understand that modifications may be performed on specific implementations of the present disclosure, or equivalent replacements may be performed on some technical features. Without departing from the spirit of the technical solutions of the present disclosure, all of the modifications and the equivalent replacements shall still be within the scope of the technical solutions of the present disclosure.

What is claimed is:

1. An assembled and disassembled window frame structure for assembling and disassembling a glass sheet, comprising:
   an upper frame;
   a rail disposed at one side of the upper frame, wherein the rail defines a sliding space, the glass sheet has one end disposed in the sliding space, and the glass sheet is configured to slide in the rail; and the rail comprises two parts that are spaced apart from each other to define a notch, and the notch is configured for assembling and disassembling of the glass sheet;
   a cover plate covering one of two opposite sides of the rail away from the glass sheet, wherein the cover plate is configured to seal the notch, and the glass sheet is slidable on the cover plate; and
   a trim strip, wherein the trim strip is connected with the cover plate, the trim strip is disposed in the cover plate and is configured to be disposed between the cover plate and the glass sheet;
   wherein the cover plate comprises a first sub-cover plate and a second sub-cover plate that are connected in a bent manner, the first sub-cover plate is configured to cover one side of the notch away from the glass sheet, the second sub-cover plate is configured to cover one side of the notch away from the upper frame, the second sub-cover plate is provided with a snap-fit portion at one end of the second sub-cover plate away from the first sub-cover plate, the snap-fit portion is a part of the second sub-cover plate that is farthest from the first sub-cover plate, the snap-fit portion extends towards the upper frame, and the snap-fit portion is configured to abut against a part of the trim strip that is farthest from the first sub-cover plate.

2. The assembled and disassembled window frame structure of claim 1, wherein the trim strip defines a sliding groove, wherein the cover plate is configured to seal the notch, and the sliding groove communicates with the sliding space at two ends of the sliding groove.

3. The assembled and disassembled window frame structure of claim 2, wherein the first sub-cover plate defines a limiting groove at one side of the first sub-cover plate facing the trim strip, the trim strip is provided with a rib at one side of the trim strip facing the first sub-cover plate, and the rib is disposed in the limiting groove.

4. The assembled and disassembled window frame structure of claim 2, further comprising a main gasket and a secondary gasket, wherein part of the main gasket is disposed in the sliding space, the secondary gasket is disposed in the sliding groove, wherein the cover plate is configured to seal the notch, and the secondary gasket is configured to abut against the main gasket at two ends of the secondary gasket.

5. The assembled and disassembled window frame structure of claim 4, wherein the sliding space is divided into a first sliding sub-space and a second sliding sub-space arranged side by side in a direction away from the upper frame, the main gasket comprises a first main sub-gasket and a second main sub-gasket, part of the first main sub-gasket is disposed in the first sliding sub-space, and the second main sub-gasket is disposed in the second sliding sub-space; and the sliding groove has a first sliding sub-groove and a second sliding sub-groove arranged side by side in the direction away from the upper frame, the secondary gasket comprises a first secondary sub-gasket and a second secondary sub-gasket, the first secondary sub-gasket is disposed in the first sliding sub-groove, and the second secondary sub-gasket is disposed in the second sliding sub-groove, wherein the cover plate is configured to seal the notch, the first secondary sub-gasket is configured to abut against the first main sub-gasket at two ends of the first secondary sub-gasket, and the second secondary sub-gasket is configured to abut against the second main sub-gasket at two ends of the second secondary sub-gasket.

6. The assembled and disassembled window frame structure of claim 4, wherein the main gasket comprises a sliding section and a sealing section, the sliding section is disposed in the sliding space, the sealing section has two ends connected with the sliding section, the sealing section is attached to the upper frame and exposed beyond the notch, and a vertical distance between a surface of the sealing section away from the upper frame and the upper frame is less than a vertical distance between a surface of the sliding section away from the upper frame and the upper frame, wherein the cover plate is configured to seal the notch, and the secondary gasket is configured to abut against the main gasket at the two ends of the secondary gasket.

7. The assembled and disassembled window frame structure of claim 5, further comprising a friction lock, wherein the friction lock comprises a support tray, a grip, and a pressing portion, the glass sheet comprises a first sub-glass sheet and a second sub-glass sheet, the first sub-glass sheet has one end disposed in the first sliding sub-space, the second sub-glass sheet has one end disposed in the second sliding sub-space, the support tray is disposed at one end of the second sub-glass sheet, the pressing portion is connected with the grip and faces the first sub-glass sheet, and the grip is configured to control the pressing portion to move towards the first sub-glass sheet to make the pressing portion press the first sub-glass sheet.

8. The assembled and disassembled window frame structure of claim 7, wherein the support tray defines a slot, the second sub-glass sheet is snapped into the slot, the slot and the second sub-glass sheet are fixed by adhesive, and the pressing portion is provided with a friction strip at an end of the pressing portion facing the first sub-glass sheet to be in friction contact with the first sub-glass sheet.

9. The assembled and disassembled window frame structure of claim 1, further comprising a latch, wherein the latch is operable in a locking state and an open state, the latch comprises a connecting portion, a locking portion, and a handle, the connecting portion is connected with the upper frame, the locking portion and the handle are connected with the connecting portion, the cover plate defines a locking hole at one side of the cover plate away from the glass sheet, and the handle is configured to switch the locking portion between the locking state in which the locking portion is disposed in the locking hole and the open state in which the locking portion is disposed outside the locking hole.

10. The assembled and disassembled window frame structure of claim 9, wherein the latch further comprises a base plate, a face plate, and a spring lamination, the locking portion and the spring lamination each are disposed between the base plate and the face plate, the spring lamination is disposed beside the locking portion, the spring lamination is provided with a raised portion at a side of the spring lamination facing the locking portion, the locking portion defines two limiting recesses, only one of the two limiting recesses is engaged with the raised portion of the spring lamination when the latch is in the locking state, and only another of the two limiting recesses is engaged with the raised portion of the spring lamination when the latch is in the open state.

11. The assembled and disassembled window frame structure of claim 9, wherein the locking portion and the handle each are rotatably connected with the connecting portion, and the locking portion and the handle extend in a same direction, wherein when the handle rotates towards the cover plate, the locking portion is configured to rotate towards the cover plate to enter the locking hole; and wherein when the handle rotates away from the cover plate, the locking portion is configured to rotate away from the cover plate to disengage from the locking hole.

12. The assembled and disassembled window frame structure of claim 11, wherein in a length direction of the cover plate, the locking hole comprises a first locking sub-hole and a second locking sub-hole communicating with the first locking sub-hole, the first locking sub-hole has a hole size larger than the second locking sub-hole, wherein when the locking portion rotates towards the cover plate to enter the locking hole, the locking portion is configured to rotate to the second locking sub-hole through the first locking sub-hole.

13. The assembled and disassembled window frame structure of claim 1, further comprising a lower frame, a cross member, a fixed glass sheet, and a weather strip, wherein the cross member is connected with the upper frame and the lower frame and is configured to separate the upper frame from the lower frame, the lower frame and the cross member cooperatively define an accommodation space, the weather strip comprises a carrier portion and a sealing portion, the carrier portion surrounds the accommodation space, the fixed glass sheet has one end disposed in the carrier portion, the sealing portion is disposed at one side of the carrier portion, and the sealing portion is configured to seal a peripheral surface of the fixed glass sheet.

14. The assembled and disassembled window frame structure of claim 13, further comprising a fastener, wherein the lower frame defines a notch slot, the fastener has one end disposed in the notch slot, and the fastener has another end connected with the carrier portion to press the fixed glass sheet.

15. The assembled and disassembled window frame structure of claim 1, two ends of the cover plate are respectively carried on ends of the rail at two ends of the notch, rivets are fixedly connected with the ends of the rail respectively, and the two ends of the cover plate define rivet holes engaged with the rivets respectively.

16. The assembled and disassembled window frame structure of claim 1, wherein the trim strip is received in a space cooperatively defined by the upper frame, the rail, and the cover plate.

* * * * *